(12) United States Patent
Wilson et al.

(10) Patent No.: US 8,808,888 B2
(45) Date of Patent: *Aug. 19, 2014

(54) FLOW BATTERY SYSTEMS

(75) Inventors: Gregory J. Wilson, Kalispell, MT (US); Kyle M. Hanson, Kalispell, MT (US)

(73) Assignee: Applied Materials, Inc., Santa Clara, CA (US)

( * ) Notice: Subject to any disclaimer, the term of this patent is extended or adjusted under 35 U.S.C. 154(b) by 699 days.

This patent is subject to a terminal disclaimer.

(21) Appl. No.: 12/868,489

(22) Filed: Aug. 25, 2010

(65) Prior Publication Data

US 2012/0052347 A1    Mar. 1, 2012

(51) Int. Cl.
*H01M 2/36* (2006.01)

(52) U.S. Cl.
USPC ............................................................. 429/72

(58) Field of Classification Search
USPC ........................................................ 429/105
See application file for complete search history.

(56) References Cited

U.S. PATENT DOCUMENTS

| | | |
|---|---|---|
| 3,936,736 A | 2/1976 | Ray |
| 3,946,600 A | 3/1976 | Rettig et al. |
| 3,976,509 A | 8/1976 | Tsai et al. |
| 4,001,043 A | 1/1977 | Momyer |
| 4,007,057 A | 2/1977 | Littauer et al. |
| 4,035,554 A | 7/1977 | Halberstadt et al. |
| 4,053,685 A | 10/1977 | Rowley et al. |
| 4,057,675 A | 11/1977 | Halberstadt et al. |
| 4,180,623 A | 12/1979 | Adams |
| 4,225,411 A * | 9/1980 | Grune .......................... 204/284 |
| 4,269,907 A | 5/1981 | Momyer et al. |
| 4,514,474 A | 4/1985 | Momyer et al. |
| 4,528,248 A | 7/1985 | Galbraith |
| 4,528,249 A | 7/1985 | Galbraith |
| 4,680,100 A * | 7/1987 | Morin ........................... 204/272 |
| 5,427,747 A | 6/1995 | Kong et al. |
| 5,501,080 A | 3/1996 | McManus et al. |
| 5,580,675 A | 12/1996 | Rouhani |
| 5,641,585 A | 6/1997 | Lessing et al. |

(Continued)

FOREIGN PATENT DOCUMENTS

JP    2010086935 A    4/2010

OTHER PUBLICATIONS

C. Ponce de Leon et al, "Redox Flow Cells for Energy Conversion." Journal of Power Sources 160 (2006) pp. 716-732.

(Continued)

*Primary Examiner* — Patrick Ryan
*Assistant Examiner* — Lucas J O'Donnell
(74) *Attorney, Agent, or Firm* — Patterson & Sheridan, LLP

(57) ABSTRACT

Embodiments of the invention generally provide for flow battery cells and systems containing a plurality of flow battery cells, and methods for improving metal plating within the flow battery cell, such as by flowing and exposing the catholyte to various types of cathodes. In one embodiment, a flow battery cell is provided which includes a cathodic half cell and an anodic half cell separated by an electrolyte membrane, wherein the cathodic half cell contains a plurality of cathodic wires extending perpendicular or substantially perpendicular to and within the catholyte pathway and in contact with the catholyte, and each of the cathodic wires extends parallel or substantially parallel to each other. In some examples, the plurality of cathodic wires may have at least two arrays of cathodic wires, each array contains at least one row of cathodic wires, and each row extends along the catholyte pathway.

13 Claims, 19 Drawing Sheets

(56) References Cited

U.S. PATENT DOCUMENTS

| | | |
|---|---|---|
| 5,705,293 A | 1/1998 | Hobson |
| 5,760,398 A | 6/1998 | Blackwell et al. |
| 5,804,055 A | 9/1998 | Coin et al. |
| 5,811,815 A | 9/1998 | Marshall et al. |
| 5,923,100 A | 7/1999 | Lukens et al. |
| 5,981,100 A | 11/1999 | Rouhani |
| 6,014,746 A | 1/2000 | Krehnke et al. |
| 6,051,436 A | 4/2000 | Reagen et al. |
| 6,157,404 A | 12/2000 | Marshall et al. |
| 6,168,884 B1 | 1/2001 | Neudecker et al. |
| 6,515,285 B1 | 2/2003 | Marshall et al. |
| 6,717,391 B2 | 4/2004 | Linkowsky et al. |
| 7,263,375 B2 | 8/2007 | Zavada et al. |
| 8,309,259 B2 * | 11/2012 | Friesen et al. ............. 429/402 |
| 8,546,028 B2 * | 10/2013 | Friesen et al. ............. 429/402 |
| 2003/0087156 A1 | 5/2003 | Broman et al. |
| 2009/0134717 A1 | 5/2009 | Marks |
| 2010/0003545 A1 | 1/2010 | Horne et al. |
| 2010/0047671 A1 | 2/2010 | Chiang et al. |
| 2011/0223450 A1 * | 9/2011 | Horne et al. ............. 429/72 |
| 2011/0244277 A1 * | 10/2011 | Gordon et al. ............. 429/51 |

OTHER PUBLICATIONS

Final Report for the Period May 9, 1983-Feb. 15, 1985, "Zinc/Ferricyanide Battery Development Phase IV", J. Robert Selman, Illinois Institute of Technology.

G. B. Adams et al. "Rechargeable Alkaline Zinc/Ferricyanide Hybrid Redox Battery." Lockheed Palo Alto Research Laboratories, pp. 812-816.

Li Zhang, et al., "Study of Zinc Electrodes for Single Flow Zinc/Nickel Battery Application." Journal of Power Sources 179 (2008) pp. 381-387.

Vladimir Neburchilov et al., "A Review of Polymer Electrolyte Membranes for Direct Methanol Fuel Cells." Journal of Power Sources 169 (2007) pp. 221-238.

PCT International Search Report and Written Opinion dated Mar. 22, 2012 for International Application No. PCT/US2011/047960.

* cited by examiner

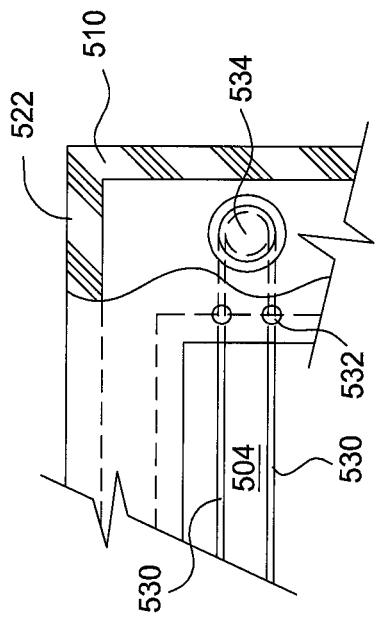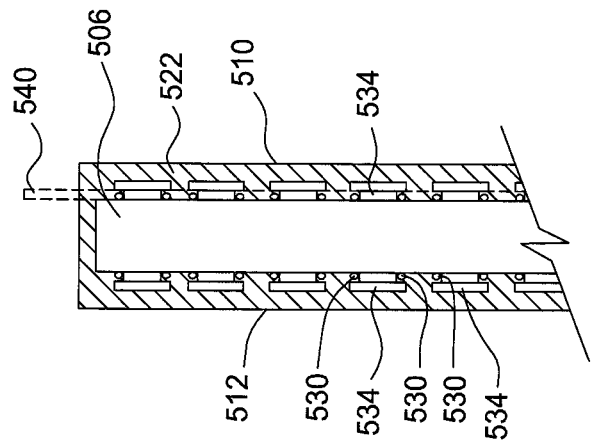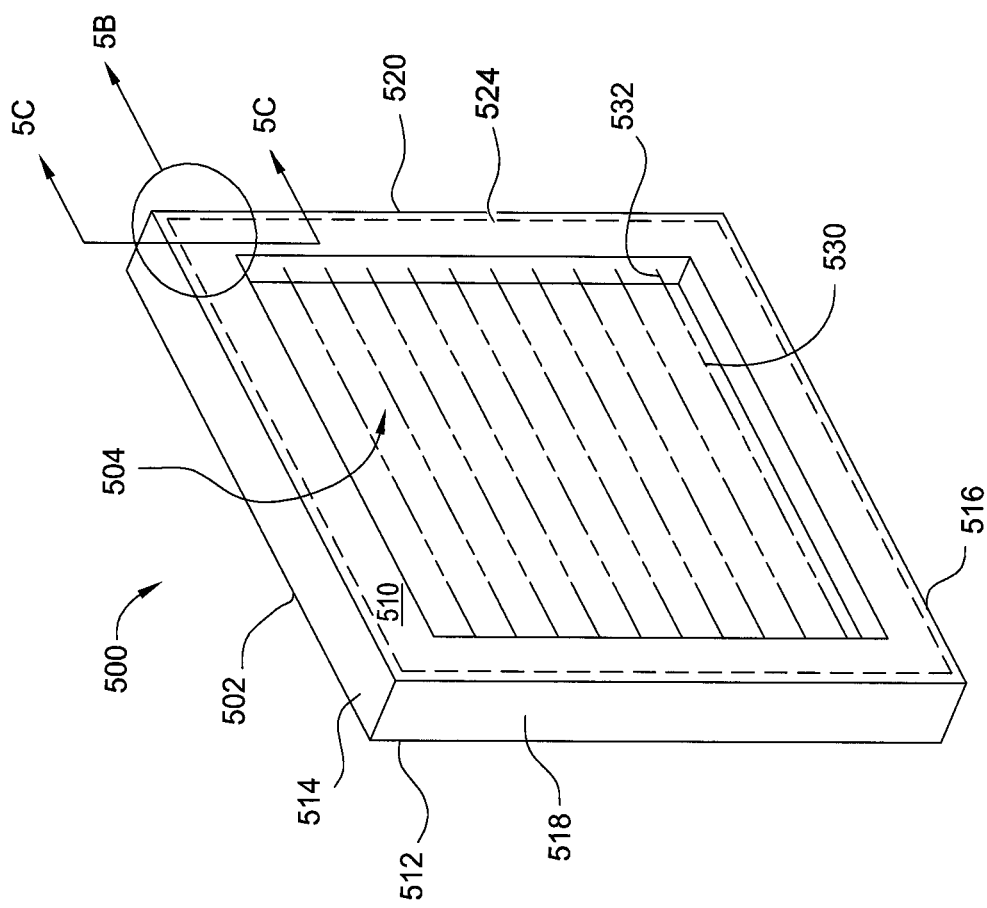

FLOW BATTERY SYSTEMS

BACKGROUND OF THE INVENTION

1. Field of the Invention

Embodiments of the invention generally relate to electrochemical cells and more particular to flow battery cells and systems.

2. Description of the Related Art

Flow batteries containing electrochemical cells have been around for several decades and are used to store electrical energy. Although a variety of flow batteries exist in the art, a couple of known types of flow batteries include the zinc-ferrocyanide battery and the zinc-bromide battery. When these types of battery cells are charged, a metal (e.g., zinc) is plated onto a planar electrode within the battery cell. For an efficient battery cell, the metal should be plated at an acceptable rate, uniformity, volume, and morphology. An important aspect with flow batteries is that all or substantially all of the metal plated onto the planar electrode is available for deplating during the discharge of the battery cell. For example, metal plated with a morphology that has poor adhesion may fall off the planar electrode before the electrical discharge and the energy stored while plating this metal would be lost.

Furthermore, a current density distribution created during plating (e.g., metal thickness uniformity) that is different than the current density obtained during the discharge leads to non-uniform metal build-up over many charge/discharge cycles. As a result, the metal will be depleted down to the electrode in some regions and not in others, possibly leading to gas evolution, higher cell potentials, and/or reduced battery efficiency. Flaked or deplated metal particles which accumulate in the battery cell may block the electrolyte flow paths or channels, enter and contaminate the electrolyte membrane, or cause other problematic issues—if left without intervention (e.g., removal of the flaked metal). Similarly, metal plated onto certain portions of the electrode and not subsequently deplated may build up over many charge cycles of the battery causing issues such as flow blockage, shorting, or membrane damage.

Additionally, the compact nature of a typical flow battery cell generally creates challenges to obtaining optimal plating performance. The typical flow battery cell often has electrodes with a large surface area separated by small gaps to minimize cell ohmic resistance (for higher battery efficiency) and to keep a plurality of flow battery cells packed within a dense array. As a result, the flow path for the electrolyte is restricted to a narrow channel which makes it difficult to provide a uniform, high rate of ion replenishment across a large surface area electrode. Also, ion replenishment can be increased with higher electrolyte flow rates, but it is desirable to keep pumping flow rates and pressure losses (pump energy requirements) as small as possible to keep the battery efficiency.

Therefore, there is a need for a flow battery cell having an improved ion replenishment (e.g., mass transfer) to the electrode surface to provide metal plating at increased rates, volumes, uniformity, and morphology over a traditional flow battery having a planar electrode.

SUMMARY OF THE INVENTION

Embodiments of the invention generally provide for flow battery cells, flow battery systems containing a plurality of the flow battery cells, and methods for improving metal plating within the flow battery cell, such as by flowing and exposing the catholyte to various types of cathodes. Each flow battery cell generally contains a cathodic half cell and an anodic half cell separated by an electrolyte membrane which is disposed between the cathodic half cell and the anodic half cell and in fluid communication with a catholyte and an anolyte. The cathodic half cell contains a cathode in conductive contact with the catholyte flowing along a catholyte pathway which extends between a catholyte inlet and a catholyte outlet disposed on opposite sides of the cathodic half cell. The anodic half cell contains an anode in conductive contact with the anolyte flowing along an anolyte pathway which extends between an anolyte inlet and an anolyte outlet disposed on opposite sides of the anodic half cell. A cathodic contact is disposed outside of the cathodic half cell and is electrically connected with the cathode, and an anodic contact is disposed outside of the anodic half cell and is electrically connected with the anode.

In one embodiment, a flow battery cell is provided which includes a cathodic half cell containing a catholyte, a catholyte inlet, a catholyte outlet, a catholyte pathway extending between the catholyte inlet and outlet and within the cathodic half cell, and a cathode containing a plurality of cathodic wires extending perpendicular or substantially perpendicular to and within the catholyte pathway and in contact with the catholyte, and each of the cathodic wires extends parallel or substantially parallel to each other. In some embodiments, the plurality of cathodic wires may have at least two arrays of cathodic wires, each array contains at least one row of cathodic wires, and each row extends along the catholyte pathway. In some examples, the plurality of cathodic wires may have 2, 3, 4, or more rows of cathodic wires. The plurality of cathodic wires may contain a first array of cathodic wires having energized cathodic wires and a second array of cathodic wires having non-energized cathodic wires during charge/discharge cycles of the flow battery. In some examples, the first array of cathodic wires may contain at least two rows of energized cathodic wires and the second array of cathodic wires contains at least two rows of non-energized cathodic wires. In some configurations during charge/discharge cycles, the first array of cathodic wires may be disposed between the second array of cathodic wires and the electrolyte membrane, or alternatively, the second array of cathodic wires may be disposed between the first array of cathodic wires and the electrolyte membrane.

The cathodic wires are generally spaced a predetermined distance from each other within each row of cathodic wires. In many examples, the predetermined distance is equal to or substantially equal to the circumference of the cathodic wire. The cathodic wires may contain cadmium or a cadmium alloy. The cathodic wires may be solid cadmium wires or may be cadmium plated metallic wires, such as steel or stainless steel plated or coated with cadmium or a cadmium alloy. The cathodic wires may have a diameter within a range from about 0.001 inch to about 0.1 inch, such as, from about 0.005 inch to about 0.05 inch, or such as, from about 0.01 inch to about 0.04 inch, or such as, from about 0.02 inch to about 0.03 inch, for example, about 0.012 inch, 0.024 inch or 0.036 inch. The cathodic wires may have a length within a range from about 5 cm to about 300 cm, for example, from about 10 cm to about 50 cm or from about 20 cm to about 200 cm.

In many embodiments described herein, the cathodic wires are disposed perpendicular to the flow path of the electrolyte (e.g., catholyte) which provides many performance improvements for the flow battery cells. The cathodic wires generally produce more uniform metal plating when compared to traditional planar electrodes. The flow battery system generally has a higher cell current density while keeping the current density on the cathodic wires reasonable (e.g., a low fraction of the limiting current)—which in turn leads to a higher battery charge rate relative to a traditional battery. The flow battery system containing a plurality of cathodic wires generally has a larger metal storage capacity leading to larger discharge times at a given current density, relative to traditional flow batteries. The sequential plating of various arrays of cathodic wires helps to achieve longer discharge times for the flow battery system, as well as to provide in-situ electrode maintenance to avoid downtime for electrode reconditioning—as compared to a traditional planar electrode. For example, when deplating off one array of cathodic wires, another array of cathodic wires may have a small trickle discharge to insure complete or near complete removal of the plated metal. The cathodic wires provide plating and deplating rates which generally are more uniform and yield good performance over many charge/discharge cycles—as compared to a traditional planar electrode. The cathodic wires yield a large surface area with a relative low volume of metal contained therein. The large surface area of the cathodic wires typically provides lower cell voltage drop and higher cell efficiency—as compared to a traditional planar electrode. In some examples, the surfaces of the cathodic wires contain cadmium, such as a solid cadmium wire, a cadmium coated steel wire, or the like and the catholyte contains metal ions (e.g., zinc ions) which are electrochemically reduced and plated onto the cathodic wires as a metal film (e.g., metallic zinc) during a charge cycle.

The flow battery cell further has an anode in fluid communication with an anodic half cell containing an anolyte, an anolyte inlet and outlet, and an anolyte pathway extending between the anolyte inlet and outlet within the anodic half cell. The flow battery cell also contains a cathodic contact electrically connected with the cathodic wires and disposed outside of the cathodic half cell, and an anodic contact electrically connected with the anode and disposed outside of the anodic half cell. The anode may be a planar anode which contains iron, nickel, chromium, steel, stainless steel, alloys thereof, or combinations thereof. In many embodiments, since the anodic half-cell reaction is a redox reaction, a porous electrode with a large surface area may be beneficially included within the flow battery cell. Examples of porous electrode material include nickel foam or graphite foam. The electrolyte membrane may contain a polymeric material and have a thickness within a range from about 0.005 mm to about 0.5 mm.

In another embodiment, a flow battery cell is provided which includes a cathodic half cell containing a planar cathode, a catholyte, a catholyte inlet, a catholyte outlet, a catholyte pathway extending between the catholyte inlet and outlet and within the cathodic half cell, and an open block flow screen within the catholyte pathway. The open block flow screen contains a plurality of blocks of an electrically insulating material and a plurality of channels disposed throughout the electrically insulating material and between the blocks. The flow battery cell further has an anodic half cell containing an anolyte, an anolyte inlet, an anolyte outlet, an anolyte pathway extending between the anolyte inlet and outlet and within the anodic half cell, and an anode in fluid communication with the anolyte pathway. Also, the flow battery cell further has an electrolyte membrane disposed between the cathodic half cell and the anodic half cell and in contact with the catholyte and anolyte, a cathodic contact electrically connected with the cathode and disposed outside of the cathodic half cell, and an anodic contact electrically connected with the anode and disposed outside of the anodic half cell.

In many examples, the open block flow screen extends from the catholyte inlet to the catholyte outlet and from the planar cathode to the electrolyte membrane. The open block flow screen is usually in physical contact with the front facing surface of the planar cathode. The blocks within the open block flow screen may have a variety of shapes, including rectangular geometry, spherical geometry, cylindrical geometries, as well as irregular three-dimensional geometry. The channels of the open block flow screen may occupy about 70% or more of the total volume encompassing the open block flow screen. In some embodiments, the open block flow screen may be a porous mat containing a fabric or woven material. The fabric or woven material contains channels which may have a diameter or a porosity within a range from about 5 µm to about 300 µm, such as from about 10 µm to about 100 µm. In other embodiments, the open block flow screen contains channels disposed between fibers or blocks, such that each fiber or block may have a width, a length, a height, and/or a diameter each independently within a range from about 10 µm to about 500 µm, such as from about 10 µm to about 250 µm, or from about 10 µm to about 150 µm, for example, from about 10 µm to about 100 µm.

In another embodiment, a flow battery cell is provided which includes a cathodic half cell containing a catholyte, a catholyte inlet, a catholyte outlet, a catholyte pathway extending between the catholyte inlet and outlet and within the cathodic half cell, and a slotted sheet cathode in fluid communication with the catholyte pathway and extending perpendicular or substantially perpendicular to the catholyte pathway. The slotted sheet cathode contains a plurality of cathodic strips separated by slots disposed through a metallic sheet (e.g., stainless steel).

The slotted sheet cathode may contain iron, steel, stainless steel, cadmium, cadmium plated stainless steel, alloys thereof, or combinations thereof. In some examples, the slotted sheet cathode may contain or be formed from a stainless steel sheet in which the slots have been stamped, punched, or otherwise formed there through. Each cathodic strip of the slotted sheet cathode may have a thickness within a range from about 0.005 inch to about 0.1 inch, such as, from about 0.01 inch to about 0.05 inch, for example, about 0.02 inch, and may have a width within a range from about 0.005 inch to about 0.1 inch, such as, from about 0.01 inch to about 0.05 inch, for example, about 0.02 inch. Also, each cathodic strip of the slotted sheet cathode may have a length within a range from about 5 cm (about 1.97 inches) to about 300 cm (about 118.11 inches). In some examples, each cathodic strip may have a length within a range from about 20 cm (about 7.87 inches) to about 200 cm (about 78.74 inches), or from about 50 cm (about 19.69 inches) to about 100 cm (about 39.37 inches). In other examples, each cathodic strip may have a length within a range from about 5 cm (about 1.97 inches) to about 50 cm (about 19.69 inches), such as from about 20 cm (about 7.87 inches) to about 30 cm (about 11.81 inches).

The flow battery cell further includes an anodic half cell containing an anolyte, an anolyte inlet, an anolyte outlet, an anolyte pathway extending between the anolyte inlet and outlet and within the anodic half cell, and an anode in fluid communication with the anolyte pathway. The flow battery cell also contains an electrolyte membrane disposed between the cathodic half cell and the anodic half cell and in contact with the catholyte and anolyte. The flow battery cell further contains a cathodic contact electrically connected with the slotted sheet cathode and disposed outside of the cathodic half cell, as well as an anodic contact electrically connected with the anode and disposed outside of the anodic half cell.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 5A-5C depict a cathodic wire assembly which may be incorporated into the flow battery cells, as described by embodiments herein.

DETAILED DESCRIPTION

Embodiments of the invention generally provide for flow battery cells, flow battery systems containing a plurality of flow battery cells, and methods for improving metal plating on to a variety of different types of cathodes within the flow battery cell. The flow battery cells described herein have improved cathodes and electrolyte flow paths and therefore provide increased rates for plating metal, uniformity, and morphology over traditional flow batteries. In embodiments described herein, the electrode on which metal is plated may be referred to as the cathode and the same half-cell is called the cathodic side during a charging cycle of the battery. However, the current flow in the battery is reversed and the electrode on which the metal was plated becomes an anode during a discharge cycle of the battery.

Figure 1A:
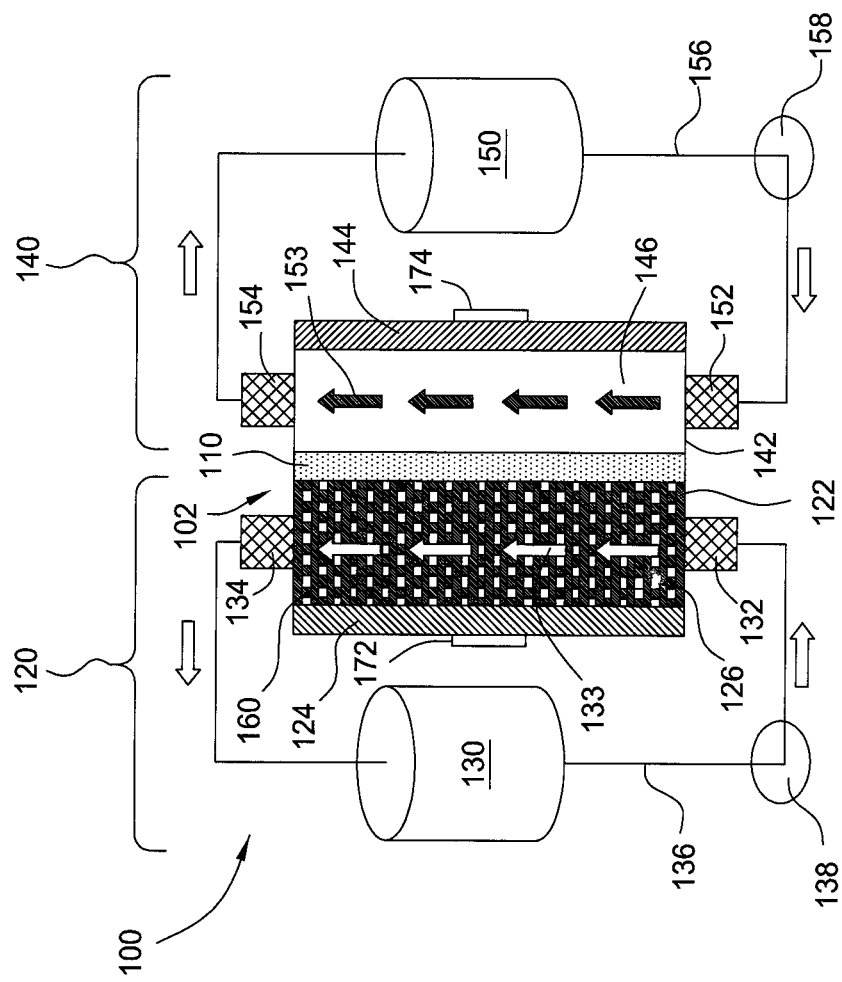
FIGS. 1A-1C depict a flow battery system containing a flow battery cell having an open block flow screen exposed to the catholyte, as described in one embodiment herein.

In one embodiment, flow battery system 100 contains a flow battery cell 102 which has a cathodic half cell 122 and an anodic half cell 142 separated by electrolyte membrane 110, as depicted in FIG. 1A. Flow battery system 100 is illustrated having just one flow battery cell 102, however, flow battery system 100 often contains multiple cells similar to flow battery cell 102. The specific quantity of flow battery cells 102 may be determined based on the total capacity of each flow battery cell 102 and the relative total desired energy capacity for the overall flow battery system 100. A plurality of flow battery cells 102 may be connected together for storing the total desired energy capacity.

Cathodic half cell 122 is on the cathodic side 120 of flow battery system 100 and contains a cathode, such as planar cathode 124, which is in fluid communication with catholyte 126. Planar cathode 124 generally has a solid surface but may have a variety of geometries, such as a flat planar cathode or a cylindrical cathode. Planar cathode 124 general contains a material such as graphite or a metal, such as nickel, iron, chromium, stainless steel, zinc, cadmium, lead, mercury, alloys thereof, or combinations thereof. In some examples, planar cathode 124 may contain cadmium-plated iron, or lead-plated iron. In some examples, planar cathode 124 contains graphite. Planar cathode 124 may have a composite structure and contain a material such as a plastic or polymer containing graphite fibers, graphite fibers plated with nickel or another of the aforementioned metals. In other examples, planar cathode 124, being a metal or composite structure, may be plated with cadmium. In some embodiments, planar cathode 124 may have a length within a range from about 5 cm to about 300 cm, such as, from about 20 cm to about 200 cm, such as, from about 50 cm to about 100 cm. In some examples, planar cathode 124 may have a length within a range from about 10 cm to about 50 cm, such as, from about 20 cm to about 30 cm. In some embodiments, planar cathode 124 may have surface area within a range from about 500 cm$^2$ to about 4,000 cm$^2$, such as, from about 1,000 cm$^2$ to about 2,000 cm$^2$.

In another embodiment, the flow battery cell 102 is configured to improve metal plating uniformity due to the dimensions of the cathodic half cell 122 which provides an increased velocity for a given volumetric fluid velocity of the catholyte 126 along catholyte pathway 133. In many configurations, the cathodic half cell 122 may have the length greater than the height along the catholyte pathway 133 and the height greater than the width along the catholyte pathway 133. This increased volumetric flow rate in turn provides minimal depletion of bulk level of chemistry across the length of catholyte pathway 133. The concentration of the catholyte 126 stays substantially constant while metal is plating on the planar cathode 124. Therefore, flow battery cell 102 has a longer length along the flow direction of catholyte pathway 133 than a width, which results in the highest fluid velocities for a given volumetric flow rate. The width of cathodic half cell 122 across catholyte pathway 133 (e.g., between planar cathode 124 and electrolyte membrane 110) may be within a range from about 1 mm to about 20 mm, such as, from about 5 mm to about 15 mm, for example, about 10 mm. The length of cathodic half cell 122 along catholyte pathway 133 (e.g., between catholyte inlet 132 and catholyte outlet 134) may be within a range from about 5 cm to about 300 cm, such as, from about 20 cm to about 200 cm, such as, from about 50 cm to about 100 cm. The height of cathodic half cell 122 along catholyte pathway 133 (e.g., normal to the width and length) may be within a range from about 5 cm to about 300 cm, such as, from about 20 cm to about 200 cm, such as, from about 50 cm to about 100 cm. In one example, cathodic half cell 122 may have a length of about 200 cm, a height of about 10 cm, and a width of about 10 mm. In another example, cathodic half cell 122 may have a length of about 100 cm, a height of about 20 cm, and a width of about 10 mm.

Catholyte 126 may be flowed into catholyte inlet 132 which is disposed on cathodic half cell 122, along catholyte pathway 133, and out from catholyte outlet 134 disposed on cathodic half cell 122. Catholyte pathway 133 extends between catholyte inlet 132 and catholyte outlet 134 within cathodic half cell 122. In most embodiments, catholyte 126 is a liquid electrolyte, such as an aqueous based electrolyte. In some examples, catholyte 126 may be a zinc electrolyte. In one example, the catholyte for a zinc/ferrocyanide battery is alkaline. The catholyte may contain a hydroxide concentration within a range from about 1 N to about 7 N, such as from about 2 N to about 5 N. The hydroxide may be sodium hydroxide or potassium hydroxide and may be saturated with zincate. In some examples, the catholyte 126 may be saturated or supersaturated, such that zincate precipitates in the bath forming solid suspensions.

Outside of flow battery cell 102, catholyte 126 circulates between cathodic half cell 122 and catholyte source tank 130 by conduits 136. Conduits 136 extend between catholyte source tank 130 to catholyte inlet 132 and from catholyte outlet 134 to catholyte source tank 130. One or multiple pumps, such as pump 138, may be incorporated within flow battery system 100 to help flow catholyte 126 to and from cathodic half cell 122. In some examples, pump 138 may be disposed between catholyte source tank 130 and catholyte inlet 132 and connected therebetween by conduits 136. In other examples, pump 138 may be disposed between catholyte source tank 130 and catholyte outlet 134 and connected therebetween by conduits 136. Therefore, in one specific example, catholyte 126 may circulate within the cathodic side 120 of flow battery system 100 by flowing from catholyte source tank 130, through conduits 136, through catholyte inlet 132, along catholyte pathway 133 and within channels 164 of open block flow screen 160 within cathodic half cell 122, through catholyte outlet 134, through conduits 136, and back to catholyte source tank 130.

Figure 1C:
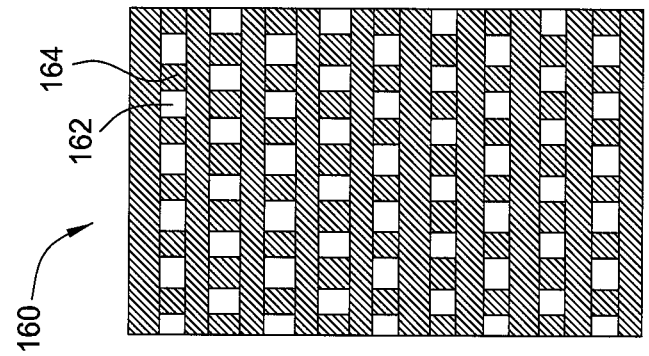
Figure 1B:
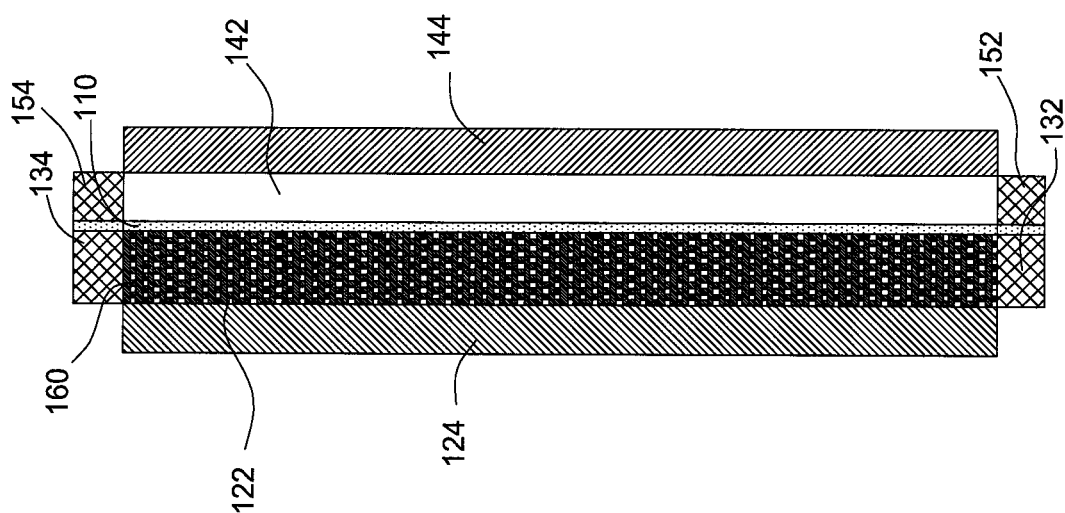

In one embodiment, an open block flow screen 160 is disposed within catholyte pathway 133, as depicted in FIGS. 1A-1C. Open block flow screen 160 contains a plurality of blocks 162 of an electrically insulating material and a plurality of channels 164 disposed throughout the electrically insulating material and between blocks 162. Open block flow screen 160 helps to provide uniform ion transfer throughout and along the long thin channels 164 within catholyte 126.

In some embodiments, open block flow screen 160 extends from catholyte inlet 132 to catholyte outlet 134 and/or from planar cathode 124 to electrolyte membrane 110. In some examples, open block flow screen 160 may be in physical contact with the front facing surface of planar cathode 124. The channels 164 of open block flow screen 160 may occupy about 50% or more of the total volume encompassing open block flow screen 160, such as about 70% or more, or about 75% or more. Therefore, open block flow screen 160 has an open structure since the volume of channels 164 occupies more volume than the volume of blocks 162.

The width of open block flow screen 160 may be the same, substantially the same, or less than the total gap distance between planar cathode 124 and electrolyte membrane 110, such as the width of cathodic half cell 122. The width of open block flow screen 160 may be within a range from about 1 mm to about 20 mm, such as, from about 1 mm to about 10 mm, for example, about 1.5 mm, about 3.5 mm, or about 10 mm. The length of open block flow screen 160 may be the same, substantially the same, or less than the distance between catholyte inlet 132 and catholyte outlet 134, such as the length of cathodic half cell 122 or the length of catholyte pathway 133. The length of open block flow screen 160 may be within a range from about 5 cm to about 300 cm, such as, from about 5 cm to about 200 cm, such as, from about 5 cm to about 100 cm, for example, from about 5 cm to about 50 cm, such as, from about 10 cm to about 30 cm, such as about 12 cm or about 20 cm.

The plurality of blocks 162 of open block flow screen 160 may have a variety of different geometries, but preferably have a three-dimension polygonal geometry, such rectangular prism geometries (e.g., cubical geometry), spherical geometries, cylindrical geometries, as well as irregular three-dimensional geometries. In some embodiments, open block flow screen 160 may be a porous mat containing a fabric or woven material, such as fibers. A plurality of channels extends between the fibers and throughout the fabric or woven material of open block flow screen 160. The fibers may have a diameter or a thickness within a range from about 10 μm to about 300 μm, such as from about 10 μm to about 200 μm. The plurality of channels have a diameter or a porosity within a range from about 5 μm to about 300 μm, from about 10 μm to about 250 μm, such as from about 10 μm to about 150 μm or from about 10 μm to about 100 μm. In one example, open block flow screen 160 contains channels which have a diameter or a porosity within a range from about 10 μm to about 100 μm.

In other embodiments, each block 162 of open block flow screen 160 may have a width within a range from about 10 μm to about 500 μm, such as from about 10 μm to about 250 μm, or from about 10 μm to about 150 μm, for example, from about 10 μm to about 100 μm, a length within a range from about 10 μm to about 500 μm, such as from about 10 μm to about 250 μm, or from about 10 μm to about 150 μm, for example, from about 10 μm to about 100 μm, and a height within a range from about 10 μm to about 500 μm, such as from about 10 μm to about 250 μm, or from about 10 μm to about 150 μm, for example, from about 10 μm to about 100 μm. The channel passing through the blocks may have a diameter or a porosity within a range from about 5 μm to about 300 μm, from about 10 μm to about 250 μm, such as from about 10 μm to about 150 μm or from about 10 μm to about 100 μm. In some examples, each block 162 may be cubical and have a width of about 125 μm, a length of about 125 μm, and a height of about 125 μm. In other examples, each block 162 may be cubical and have a width of about 625 μm, a length of about 625 μm, and a height of about 625 μm.

In embodiments described herein, open block flow screen 160 may contain or be composed of an electrically insulating material, such as a polymeric material, a co-polymeric material, or an oligomeric material. Open block flow screen 160 may contain or be made from exemplary materials such as polyethylene, polypropylene, natural polypropylene (NPP), polyphenylene oxide (PPO), polyphenylene sulfide (PPS), polyvinyl chloride (PVC), polyvinylidene fluoride (PVDF), fluorinated ethylene propylene (FEP), perfluoroalkoxy (PFA), polytetrafluoroethylene (PTFE), as well as other fluoropolymers, derivatives thereof, or combinations thereof. In one example, open block flow screen 160 contains polypropylene or derivatives thereof. In some embodiments, open block flow screen 160 may contain a woven plastic material which is inert to the electrolyte, such as a woven fabric of fibers containing polypropylene or derivatives thereof. Open block flow screen 160 may be sparse in the direction parallel with the electrolyte flow.

Anodic half cell 142 is on the anodic side 140 of flow battery system 100 and contains an anode, such as anode 144, which may be in fluid and/or conductive communication with anolyte 146. Anolyte 146 may be a liquid electrolyte, such as an aqueous based electrolyte or a solid electrolyte. In embodiments when anolyte 146 is a liquid anolyte, anolyte 146 flows into anolyte inlet 152 disposed on anodic half cell 142, along anolyte pathway 153, and out from anolyte outlet 144 disposed on anodic half cell 142. Anolyte pathway 153 extends between anolyte inlet 152 and anolyte outlet 154, as well as between anode 144 and electrolyte membrane 110 within anodic half cell 142.

Outside of flow battery cell 102, in embodiments when anolyte 146 is a liquid anolyte, anolyte 146 circulates between anodic half cell 142 and anolyte source tank 150 by conduits 156. Conduits 156 extend between anolyte source tank 150 to anolyte inlet 152 and from anolyte outlet 154 to anolyte source tank 150. One or multiple pumps, such as pump 158, may be incorporated within flow battery system 100 to help flow anolyte 146 to and from anodic half cell 142. In some examples, pump 158 may be disposed between anolyte source tank 150 and anolyte inlet 142 and connected therebetween by conduits 156. In other examples, pump 158 may be disposed between anolyte source tank 150 and anolyte outlet 134 and connected therebetween by conduits 156. Therefore, in one specific example, anolyte 146 may circulate within the anodic side 140 of flow battery system 100 by flowing from anolyte source tank 150, through conduits 156, through anolyte inlet 152, along anolyte pathway 153 within anodic half cell 142, through anolyte outlet 154, through conduits 156, and back to anolyte source tank 150.

In some embodiments, anolyte 146 may be a solid anolyte, and therefore, certain portions or elements of the anodic side 140, as depicted in FIG. 1A, may be optional or absent portions or derivatives thereof, such as anolyte inlet 152, anolyte outlet 154, anolyte source tank 150, conduits 156, and/or pump 158. A solid anolyte 246 may have a thickness within a range from about 0.2 mm to about 5 mm, or from about 0.5 mm to about 3 mm, such as about 1 mm or about 2 mm.

In some examples, anolyte 146 may be an Fe(II)/Fe(III) electrolyte, such as a ferro/ferricyanide electrolyte. Anolyte 146 may initially contain a ferrocyanide compound which is oxidized to the respective ferricyanide compound during a recharge of the battery or cell. Several exemplary ferrocyanide compounds that may be contained within the anolyte 146 include sodium ferrocyanide, such as tetrasodium hexacyanoferrate decahydrate ($Na_4Fe(CN)_6 \cdot 10H_2O$), also known as yellow prussiate of soda, available from ScienceLab.com, as well as potassium ferrocyanide, such as tetrapotassium hexacyanoferrate decahydrate ($K_4Fe(CN)_6 \cdot 10H_2O$). Anolyte 146 generally contains hydroxide and additional hydroxide solution may be added to the anolyte 146 during the charge/discharge cycles in order to maintain a desired hydroxide concentration. The aqueous hydroxide solution generally contains sodium hydroxide, potassium hydroxide, or mixtures thereof.

Anode 144, such as a redox electrode, may have a variety of geometries, such as a flat planar anode, a planar anode, a plate anode, a cylindrical anode, or the like. Anode 144 may be may be solid, or may have a high surface area configuration, such as being porous, expanded or foamed. Usually, anode 144 contains nickel, iron, chromium, steel, stainless steel, graphite, alloys thereof, derivatives thereof, or combinations thereof. Anode 144 may be plated or coated with another material or metal, such as a graphite anode coated or plated with nickel or a nickel alloy. In one example, anode 144 is a planar electrode and contains stainless steel. In another example, anode 144 is porous, foamed, or expanded and contains nickel or a nickel alloy, such as nickel foam, expanded nickel, perforated nickel, nickel wire, or woven nickel wire. In another example, anode 144 contains graphite, such as porous graphite, graphite foam, nickel plated graphite foam, graphite felt, nickel plated graphite felt, or derivatives thereof. In some embodiments, anode 144 may have a length within a range from about 5 cm to about 300 cm, such as from about 10 cm to about 50 cm, such as from about 20 cm to about 30 cm and may have a height within a range from about 5 cm to about 300 cm, such as from about 10 cm to about 50 cm, such as from about 20 cm to about 30 cm. Additionally, anode 144 may have a thickness within a range from about 0.5 mm to about 5 mm, such as from about 1 mm to about 3 mm.

Electrolyte membrane 110 is disposed between cathodic half cell 122 and anodic half cell 142 and in contact with both catholyte 126 and anolyte 146. Electrolyte membrane 110 may be an exchange membrane, a separator, or the like which isolates catholyte 126 and anolyte 146. In many embodiments, electrolyte membrane 110 is an ionic exchange membrane—such as a cationic exchange membrane—which is semipermeable to some cations (e.g., Na+ or K+) which migrate through electrolyte membrane 110 between the anolyte 146 and catholyte 126. Electrolyte membrane 110 may contain or be made from an ionic resin and/or a polymeric, co-polymeric, or oligomeric material, such as polytetrafluoroethylene, polyvinyl, polystyrene, polyethylene, polypropylene, polyester, derivatives thereof, or combinations thereof. Generally, electrolyte membrane 110 is durable and has high ionic conductivity and chemical stability. In one example, electrolyte membrane 110 contains a polymeric backbone of polytetrafluoroethylene (PTFE), such as NAFION® 112, 115, 117, and 424 membranes, which are commercially available from DuPont. In another example, electrolyte membrane 110 contains a co-polymer of tetrafluoroethylene and a vinylene monomer, such as a XUS® membrane, which is commercially available from Dow Chemical Company. Electrolyte membrane 110 may have a thickness within a range from about 0.005 mm to about 0.5 mm. In some examples, electrolyte membrane 110 may have a thickness of about 0.015 mm. In an alternative embodiment, electrolyte membrane 110 may be a separator, such as a ribbed separator, formed from a polymeric material and precipitated silica, such that the internal structure is very porous, tortuous, and hydrophilic (e.g., hydrophilic porous plastic separator), which is commercially available from the AMER-SIL company.

Cathodic contact 172 is in electrical contact to planar cathode 124 and anodic contact 174 is in electrical contact to anode 144, as depicted in FIG. 1A. Cathodic contact 172 may be disposed on flow battery cell 102 and extends between the inside and outside of cathodic half cell 122. Similarly, anodic contact 174 may be disposed on flow battery cell 102 and extends between the inside and outside of anodic half cell 142.

Cathodic contact 172 and anodic contact 174 may be coupled to or otherwise in electrical contact with for discharging or removing the stored power from flow battery cell 102 while in use, or alternatively, for charging or storing power to flow battery system 100. Each flow battery cell 102 may be electrically connected (e.g., in parallel or in series) with cathodic contacts 172 and anodic contacts 174 to form the desirable circuit for flow battery system 100. In one example, the plurality of flow battery cells 102 may be electrically connected in series in order to have constant amperage and increased voltage for flow battery system 100. Alternatively, the plurality of flow battery cells 102 may be electrically connected in parallel in order to have constant voltage and increased amperage for flow battery system 100.

Open block flow screen 160 causes flow disruption of catholyte 126 thereby periodically disturbs the diffusion layer on planar cathode 124 while plating a metal which keeps the plating of metal much more uniform across planar cathode 124 compared to processes in which metal was plated to a traditional planar electrode in the absence of open block flow screen 160. Instead of a continuous drop in the plating rate across planar cathode 124, the current density has much smaller non-uniformity (e.g., about 15% to about 30%) that repeats according to the scale of blocks 162 and channels 164 of open block flow screen 160. The smaller and non-uniform current density is due to better mixing of catholyte 126 and therefore allows charging/discharging at a higher current density relative to planar cathode 124 without the open block flow screen 160.

Catholyte 126 may have a forward flow (as depicted in FIG. 1A with arrows) or may have a reverse flow during different time periods of the charge/discharge cycles. The fluid velocity of catholyte 126 may be within a range from about 1 cm/sec (centimeter/second) to about 25 cm/sec, such as from about 2 cm/sec to about 15 cm/sec, for example, about 5 cm/sec or about 10 cm/sec. Anolyte 146 may have a forward flow (as depicted in FIG. 1A with arrows) or may have a reverse flow during different time periods of the charge/discharge cycles. The fluid velocity of anolyte 146 may be within a range from about 1 cm/sec to about 25 cm/sec, such as from about 2 cm/sec to about 15 cm/sec, for example, about 5 cm/sec or about 10 cm/sec. The planar cathode 124 combined with open block flow screen 160 may have a localized current density within a range from about 1 mA/cm$^2$ (milliamps per squared centimeters) to about 75 mA/cm$^2$, such as from about 5 mA/cm$^2$ to about 50 mA/cm$^2$, for example, about 10 mA/cm$^2$, about 20 mA/cm$^2$, or 40 mA/cm$^2$.

FIGS. 2A-2I depict a flow battery system 200 containing a flow battery cell 202 which has a cathodic half cell 222 and an anodic half cell 242 separated by electrolyte membrane 210, as described in multiple embodiments herein. Cathodic half cell 222 is on the cathodic side 220 of flow battery system 200 and has a cathode containing a plurality of cathodic wires 228, which extend through and are in fluid communication with catholyte 226 in catholyte pathway 233. The pluralities of cathodic wires 228 extend perpendicular or substantially perpendicular to catholyte pathway 233 and each of the cathodic wires 228 extends parallel or substantially parallel to each other.

The flow battery system 200 depicted in FIGS. 2A-2I and described by embodiments herein provide a plurality of cathodic wires 228 which generally produce more uniform metal plating when compared to traditional planar electrodes. Cathodic wires 228 placed perpendicular or substantially perpendicular to the flow path of the electrolyte (e.g., catholyte 226) which provide many performance improvements for the flow battery cells 202. Flow battery system 200 generally has a higher cell current density while keeping the current density on the wires reasonable (e.g., a low fraction of the limiting current)—which in turn leads to a higher battery charge rate relative to a traditional battery. Flow battery system 200 containing cathodic wires 228 generally has a larger metal storage capacity leading to larger discharge times at a given current density, relative to traditional flow batteries. The sequential plating of various arrays of electrodes—such as cathodic wires 228—helps to achieve longer discharge times for flow battery system 200, as well as to provide in-situ electrode maintenance to avoid downtime for electrode reconditioning—as compared to a traditional planar electrode. For example, when deplating metal off one array of cathodic wires 228 during a battery discharge, another array of cathodic wires 228 may have a small trickle discharge to insure complete or substantially complete removal of the plated metal. The cathodic wires 228 generally provide plating and deplating rates which are more uniform and yield good performance over many charge/discharge cycles—as compared to a traditional planar electrode. The cathodic wires 228 yield a large surface area with a relative low volume of metal contained therein. The large surface area of the cathodic wires 228 generally provides lower cell voltage drop and higher cell efficiency—as compared to a traditional planar electrode. In some examples, the surfaces of the cathodic wires 228 contain cadmium, such as a solid cadmium wire, a cadmium coated steel wire, or the like and the catholyte 226 contains metal ions (e.g., zinc ions) which are electrochemically reduced and plated onto the cathodic wires 228 as a metal film (e.g., metallic zinc) during a charge cycle of flow battery cell 202 or flow battery system 200.

Figure 2A:
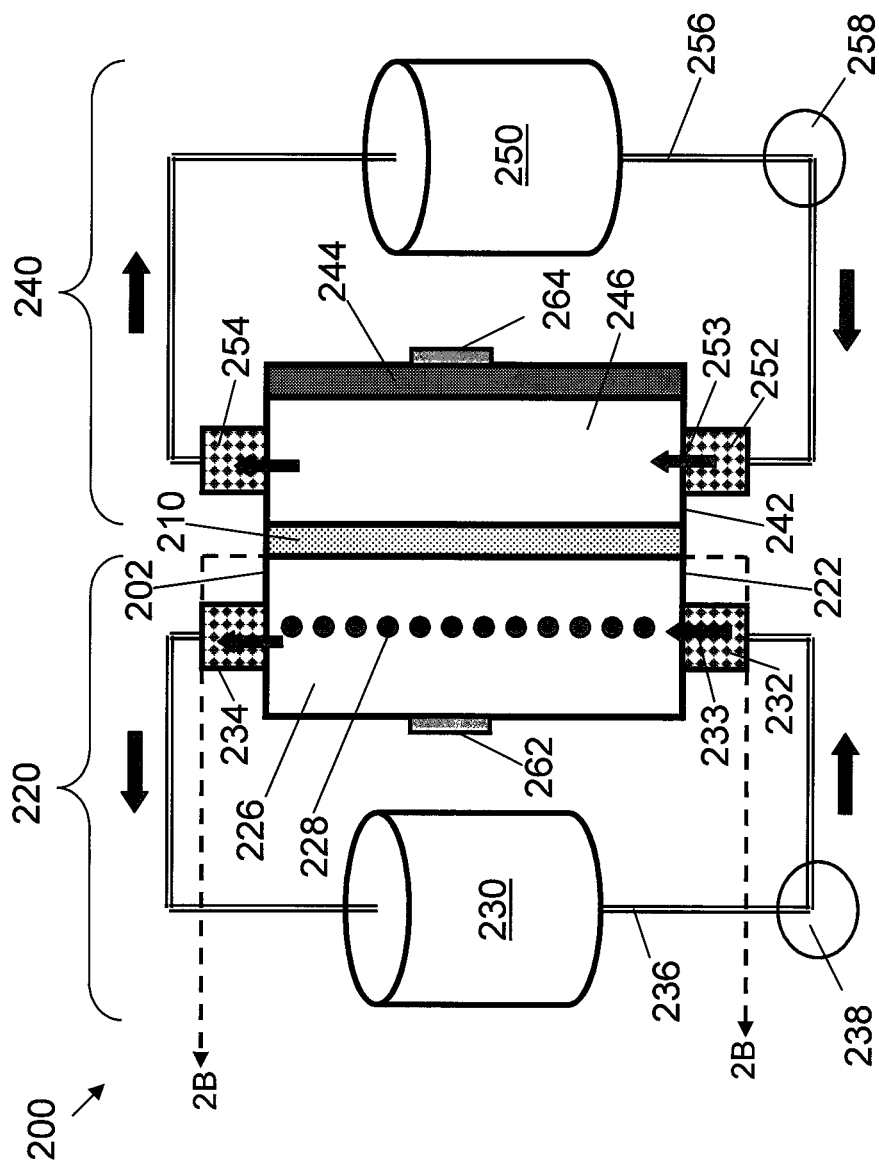
FIGS. 2A-2I depict flow battery systems containing various configurations of cathodic wires, as described by embodiments herein.
Figure 2B:
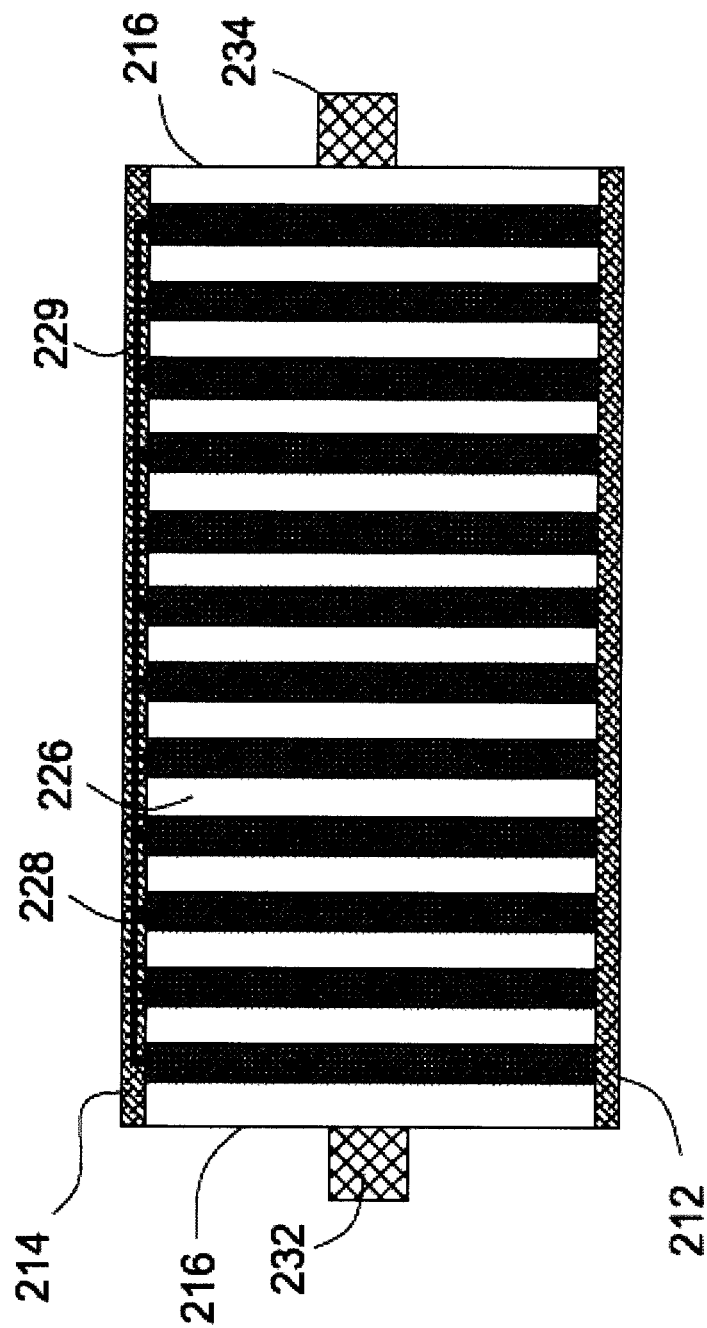

In one embodiment, FIGS. 2A-2B depict cathodic half cell 222 containing a single row of cathodic wires 228 within catholyte pathway 233. The single row of cathodic wires 228 extend along catholyte pathway 233 while each individual cathodic wire 228 extends perpendicular or substantially perpendicular to catholyte pathway 233. Catholyte 226 is flowed through cathodic half cell 222 and along catholyte pathway 233 while being exposed to the cathodic wires 228. The cathodic wires 228 electrochemically reduce the metal ions from the catholyte while plating the surfaces of the cathodic wires 228 during the charging cycles and electrochemically oxidize the plated metal from the surfaces of the cathodic wires 228 to form metal ions which diffuse back into the catholyte 226 during the discharging cycles. Catholyte pathway 233 extends between catholyte inlet 232 and catholyte outlet 234 which are disposed on opposite sides if the cathodic half cell 222.

Each of the cathodic wires 228 may independently have various geometries or shapes such as cylindrical, rectangular, oval, derivatives thereof, as well as other geometries. The cathodic wires 228 may be cylindrical wires or wires having at least one side, such as a rectangular wire or a square wire. The cathodic wires 228 may be solid wires, hollow wires or tubes, ribbons, rods, bars, strips, or derivatives thereof. Each of the cathodic wires, including cathodic wires 228, 228a, or 228b, may independently contain a metal, such as cadmium, iron, steel, stainless steel, nickel, chromium, silver, gold, platinum, palladium, platings or coatings thereof, alloys thereof, derivatives thereof, or combinations thereof. In some examples, each of the cathodic wires contains cadmium or a cadmium alloy. Each cathodic wire may be a solid cadmium wire, a solid cadmium alloy wire, a cadmium plated metallic wire, such as a steel or stainless steel wire plated or coated with cadmium or a cadmium alloy. In one example, the cathodic wires are solid wires containing cadmium or a cadmium alloy.

The cathodic wires 228 are generally spaced a predetermined distance from each other within the row of cathodic wires 228. In some embodiments, the predetermined distance may be equal to or substantially equal to the circumference of the individual cathodic wire 228. The predetermined distance or spacing between the cathodic wires 228 provides sufficient space for plates to grow around each cathodic wire 228, and leave room to sustain good mass-transfer and avoid the metal accumulation from causing the wires to touch. The predetermined distance or spacing between the cathodic wires 228 provides enough time for a wake formed behind one cathodic wire 228 to sufficiently "heal" so that the next downstream cathodic wire 228 still receives adequate mass-transfer from the catholyte 226. The wake is a portion or volume of the catholyte 226 having a reduced gradient concentration of one or more components such as the metal ions within the catholyte 226. However, as the wake flows downstream, the remaining metal ions within the catholyte 226 diffuse throughout the catholyte 226 to reduce or remove the wake while exposing the next downstream cathodic wire 228. Therefore, the predetermined distance or spacing between the cathodic wires 228 provides enough time for abundant or higher concentrations of components in one region to diffuse through the catholyte 226 to regions having shortages or lower concentrations of that component.

In another embodiment described herein, the total surface area of all cathodic wires 228 within the row may be equal to or substantially equal to the surface area of a more traditional planar electrode found in other flow batteries. Therefore, the surface area available for metal plating during the charging cycles may be adjusted by adding or removing individual cathodic wires 228 to or from cathodic half cell 222. Similarly, if the surface area of a single row of cathodic wires 228 has been normalized and equivalent to the surface area of a traditional planar electrode, than each additional row of cathodic wires 228 may be included within cathodic half cell 222 to provide the plating equivalents to the same number of traditional planar electrodes. The addition of cathodic wires 228 within cathodic half cell 222 provides additional surface area for having better control of the quality of the deposited metal film, as well as, more metal storage or energy storage.

FIG. 2B depicts contact bar 229 coupled to and in electrical contact with each of the cathodic wires 228. One contact bar 229 is depicted in FIG. 2B, however, numerous contact bars may be used to individually control each cathodic wire 228 or an array of cathodic wires 228. Contact bar 229 may be disposed inside or outside the cathodic half cell 222, or within any of the surrounding walls or surfaces of cathodic half cell 222, such as the bottom portion 212, the top portion 214, and/or the sides 216 of cathodic half cell 222. In some embodiments, contact bar 229 may be disposed within the top portion 214 of cathodic half cell 222, as depicted in FIG. 2B. In other embodiments, contact bar 229 may be disposed outside of the surrounding walls or surfaces of cathodic half cell 222. For example, contact bar 229 or a contact junction thereof may protrude through the bottom portion 212, the top portion 214, and/or the sides 216 of cathodic half cell 222 to be physically and electrically coupled with each of the cathodic wires 228, as depicted in FIG. 2D or 2F. Alternatively, each of the cathodic wires 228 may protrude through the bottom portion 212, the top portion 214, and/or the sides 216 of cathodic half cell 222 to be physically and electrically coupled with contact bar 229. Contact bar 229 contains a conductive material, such as a metal. Contact bar 229 may be a wire, a plate, a bar, a ribbon, or similar contact/conductive surface. Contact bar 229 may contain iron, steel, stainless steel, copper, nickel, chromium, silver, gold, aluminum, cadmium, platinum, palladium, platings thereof, alloys thereof, derivatives thereof, or combinations thereof. In some embodiments, contact bar 229 may also in electrical contact with cathodic contact 262.

In one embodiment, contact bar 229 may be the same wire used as the cathodic wires 228. A wire may be incorporated into cathodic half cell 222 by weaving the wire between the catholyte pathway 233 and through the bottom and top portions 212 and 214 of cathodic half cell 222. In some examples, the wire may be a solid cadmium wire, a solid cadmium alloy wire, a cadmium plated metallic wire, such as a steel or stainless steel wire plated with cadmium or a cadmium alloy.

Figure 2C:
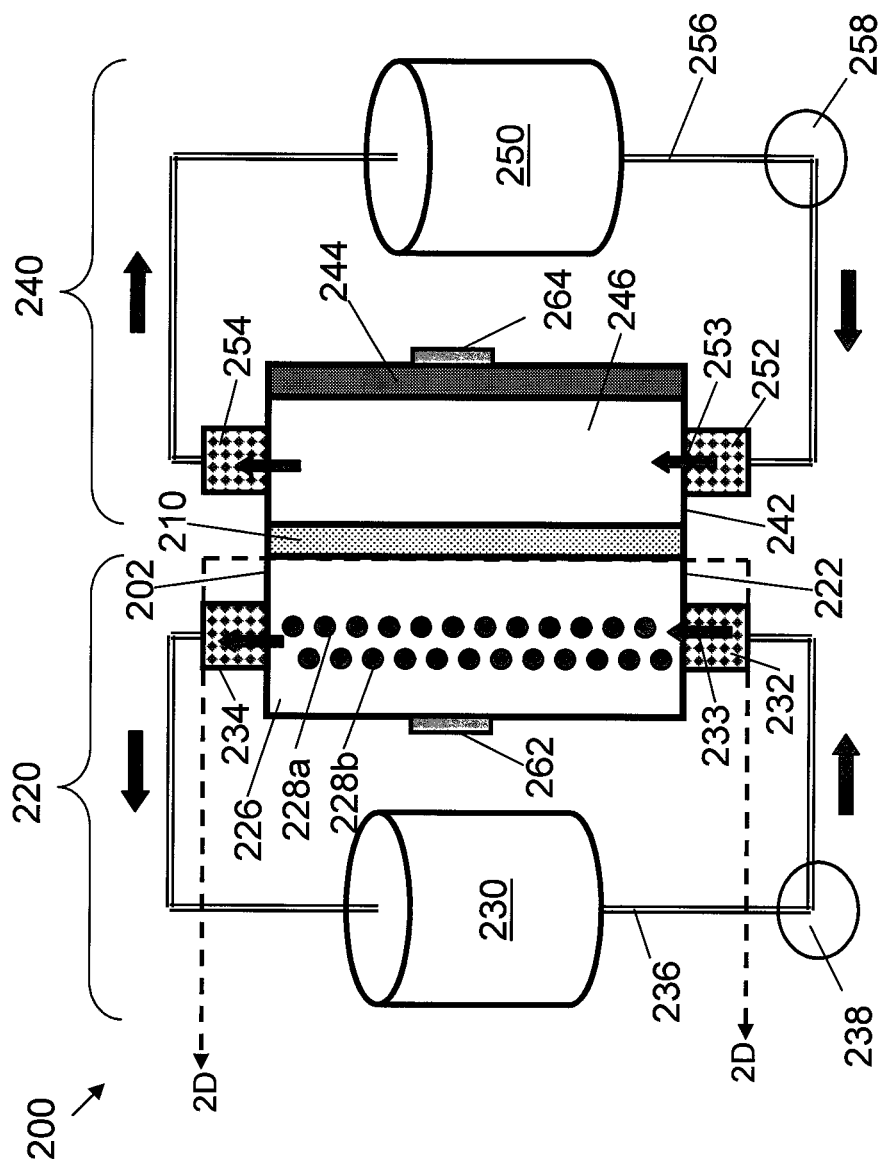
Figure 2D:
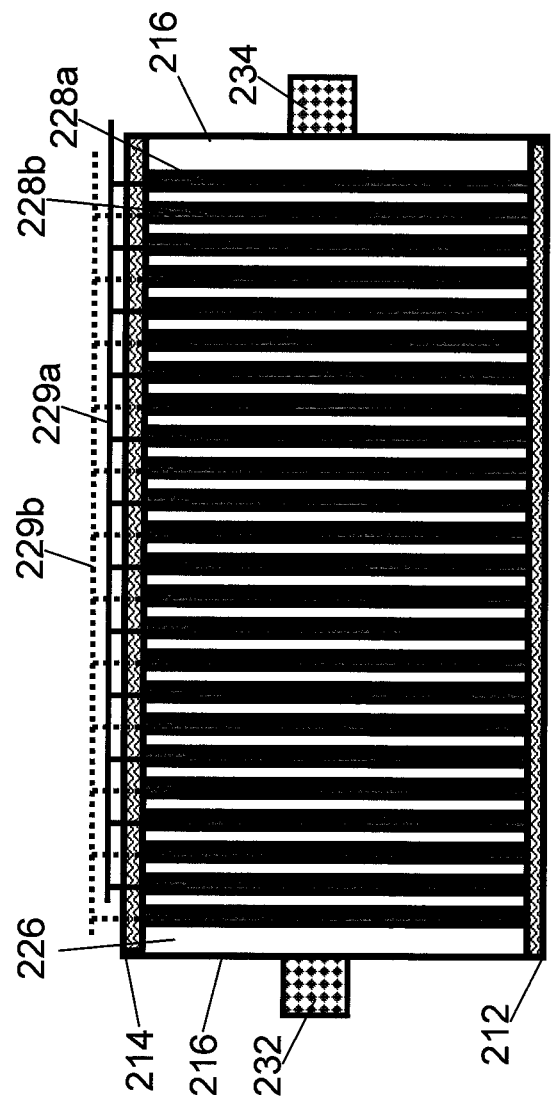
Figure 2E:
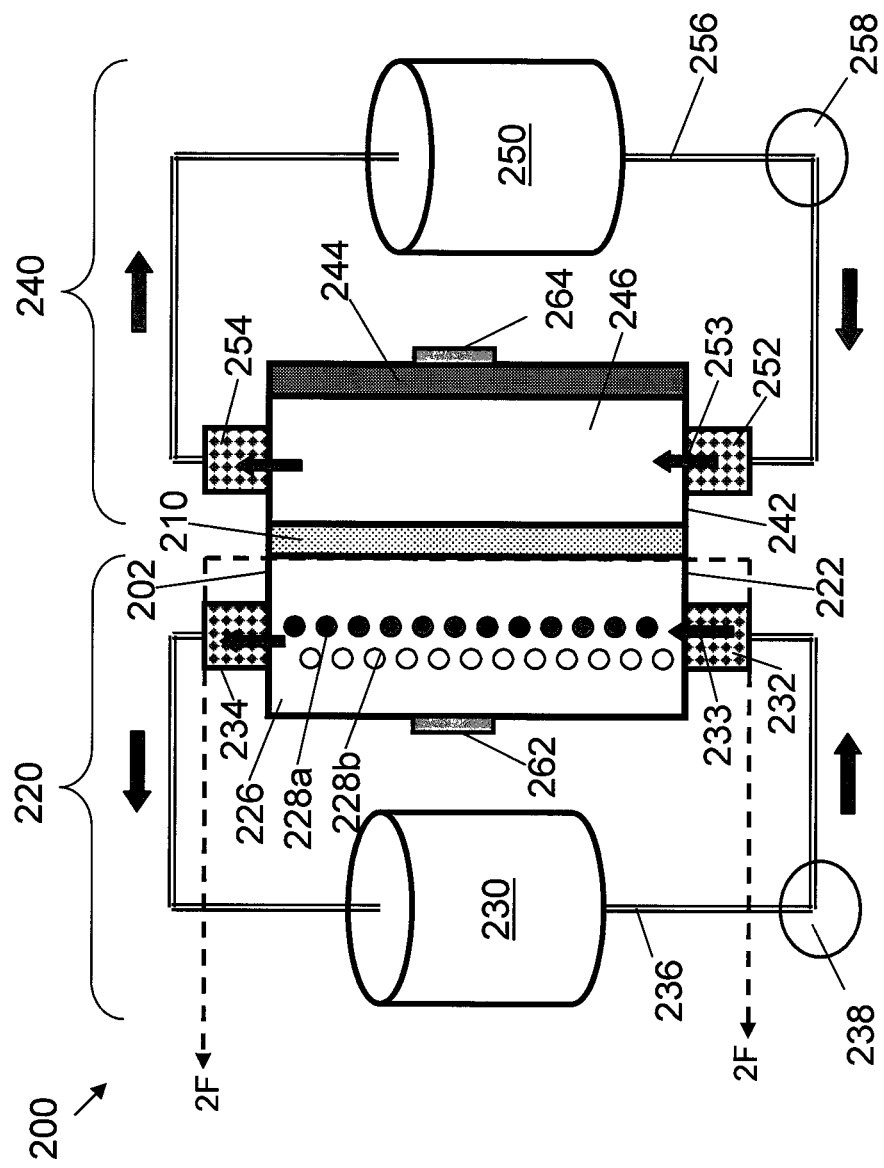
Figure 2F:
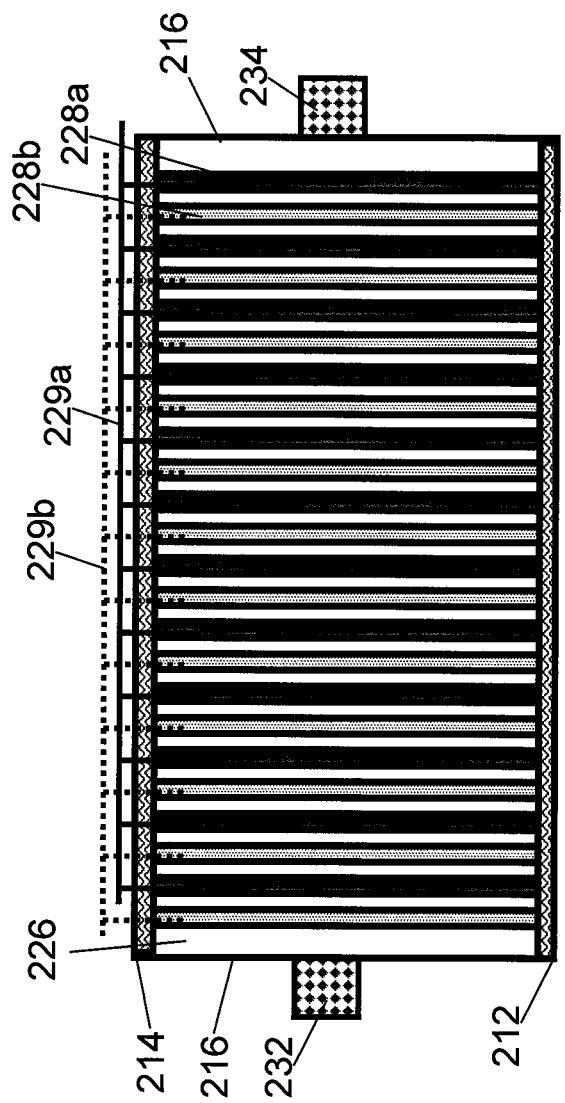

FIGS. 2C-2F depict cathodic half cell 222 containing two rows of cathodic wires 228a and 228b, as described by other embodiments herein. FIGS. 2C-2D depict two staggered rows of cathodic wires 228a and 228b exposed to catholyte within catholyte pathway 233. Both rows of cathodic wires 228a and 228b extend along catholyte pathway 233 while each individual cathodic wire 228 extends perpendicular or substantially perpendicular to catholyte pathway 233. Each cathodic wire 228a within the row closest to the electrolyte membrane 210 is coupled with contact bar 229a while each cathodic wire 228b in the row furthest from the electrolyte membrane 210 is coupled with contact bar 229b, as depicted in FIG. 2D. Therefore, each row of the cathodic wires 228a and 228b may be independently connected or disconnected electrically from the cathodic contact 262 via contact bars 229a and 229b. Cathodic wires 228a and 228b which are electrically connected to cathodic contact 262 are referred to as "energized" cathodic wires while cathodic wires 228a and 228b which are electrically disconnected to cathodic contact 262 are referred to as "non-energized" cathodic wires. Also, each row of the cathodic wires 228a and 228b may be simultaneously or sequentially connected or disconnected electrically from the cathodic contact 262.

A controller and/or a set of switches (not shown) may be coupled between and in electrical communication to the cathodic contact 262 and each of the contact bars 229a and 229b. The controller and/or the set of switches may be used to independently control by electrically connecting/disconnecting each of the contact bars 229a and 229b—and therefore each row of the cathodic wires 228a and 228b—to the cathodic contact 262. In some configurations, the controller and/or the set of switches may be used to independently charge and/or discharge each row of the cathodic wires 228a and 228b. Once in electrical contact with cathodic contact 262, the cathodic wires 228a and 228b within both rows are energized cathodic wires which are capable of being plated/deplated during charge/discharge cycles.

For example, as depicted by FIGS. 2E-2F, metal from a first array of electrodes, cathodic wires 228b, is deplating during the discharge of the flow battery cell 202, while a second array of electrodes, cathodic wires 228a, is electrically disconnected from the cathodic contact 262. Initially, cathodic wires 228b are energized cathodic wires which are electrically connected to the cathodic contact 262 while cathodic wires 228a are non-energized cathodic wires. The power produced by the flow battery cell 202 is eventually reduced to an inefficient trickle charge such that the produced power is below a predetermined minimum threshold for desirable battery performance. This reduction of power is proportional to the reduction of the total surface area of the cathodic wires 228b—which are both caused by the deplating of metal from the cathodic wires 228b. Therefore, the second array electrodes, cathodic wires 228a, containing a full metal plating, is energized or electrically connected to the cathodic contact 262 by the contact bar 229a. The first array of electrodes, cathodic wires 228b, may be left energized or electrically connected to the cathodic contact 262 by the contact bar 229b until substantially or completely deplated of metal. Alternatively, the cathodic wires 228b may be non-energized or electrically disconnected from the cathodic contact 262.

Although FIGS. 2E-2F depict the cathodic wires 228a as being initially energized cathodic wires and the cathodic wires 228b as being initially non-energized cathodic wires, in other embodiments, a charge/discharge cycle of the flow battery cell 202 or the flow battery system 200 may be performed in the reverse order. Therefore, the first array of electrodes may be the cathodic wires 228a which initially are energized and deplate metal during the discharge of the flow battery cell 202, while the cathodic wires 228b—the second array of electrodes—remain non-energized or electrically disconnected from the cathodic contact 262. Once the flow battery cell 202 is producing power below the predetermined minimum threshold, the cathodic wires 228b are energized or placed in electrical contact to the cathodic contact 262 by the contact bar 229b. The cathodic wires 228a may be left energized such as to remain in electrical contact to the cathodic contact 262 by the contact bar 229a in order to deplate remaining metal thereon. In an alternative embodiment, both rows of the cathodic wires 228a and 228b may be simultaneously energized cathodic wires during the charge/discharge cycles of the flow battery cell 202 or the flow battery system 200.

Figure 2G:
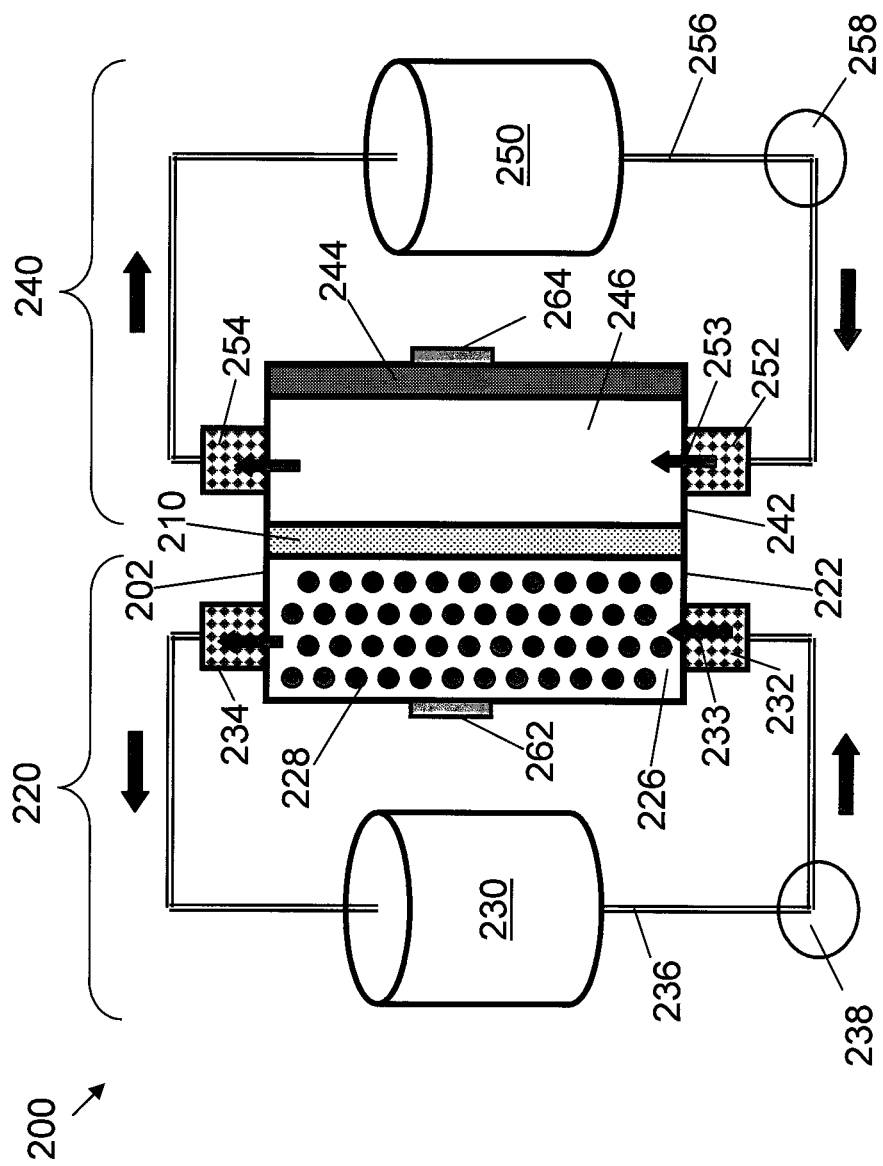
Figure 2H:
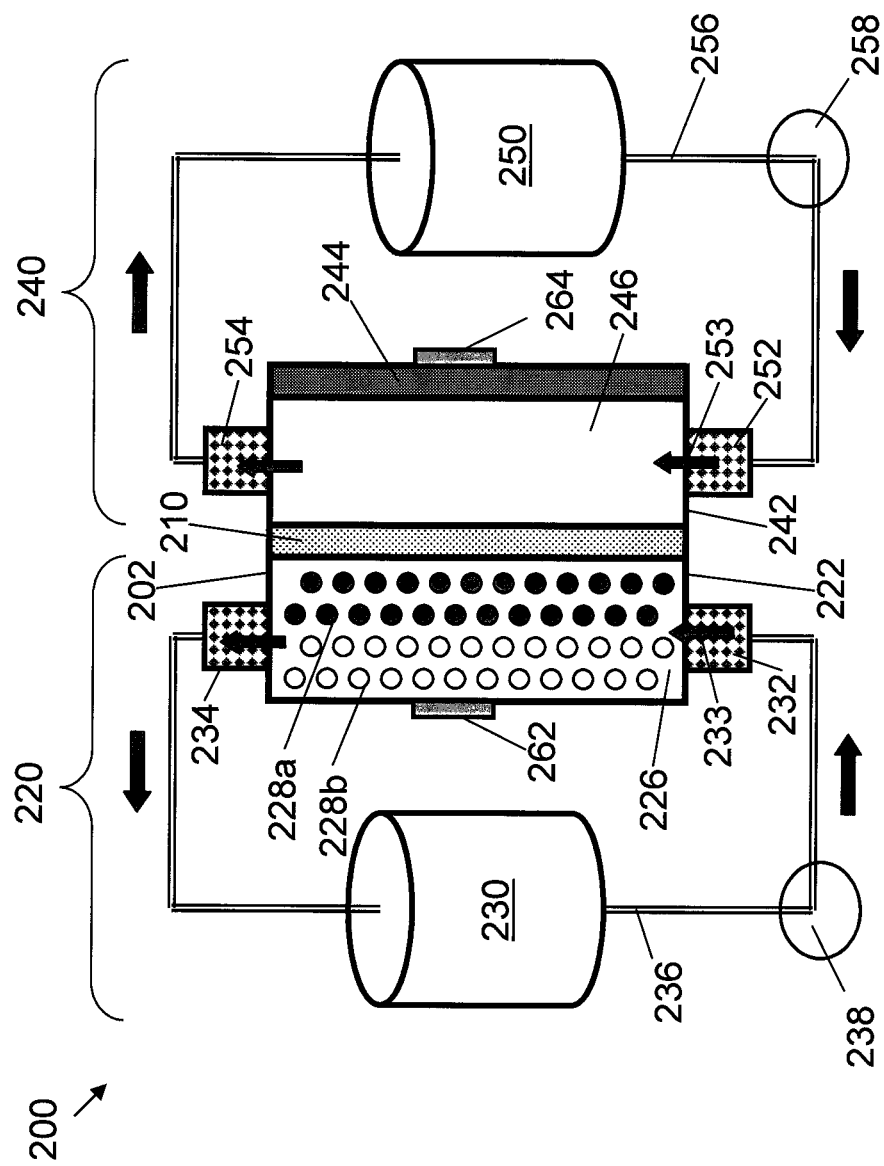
Figure 2I:
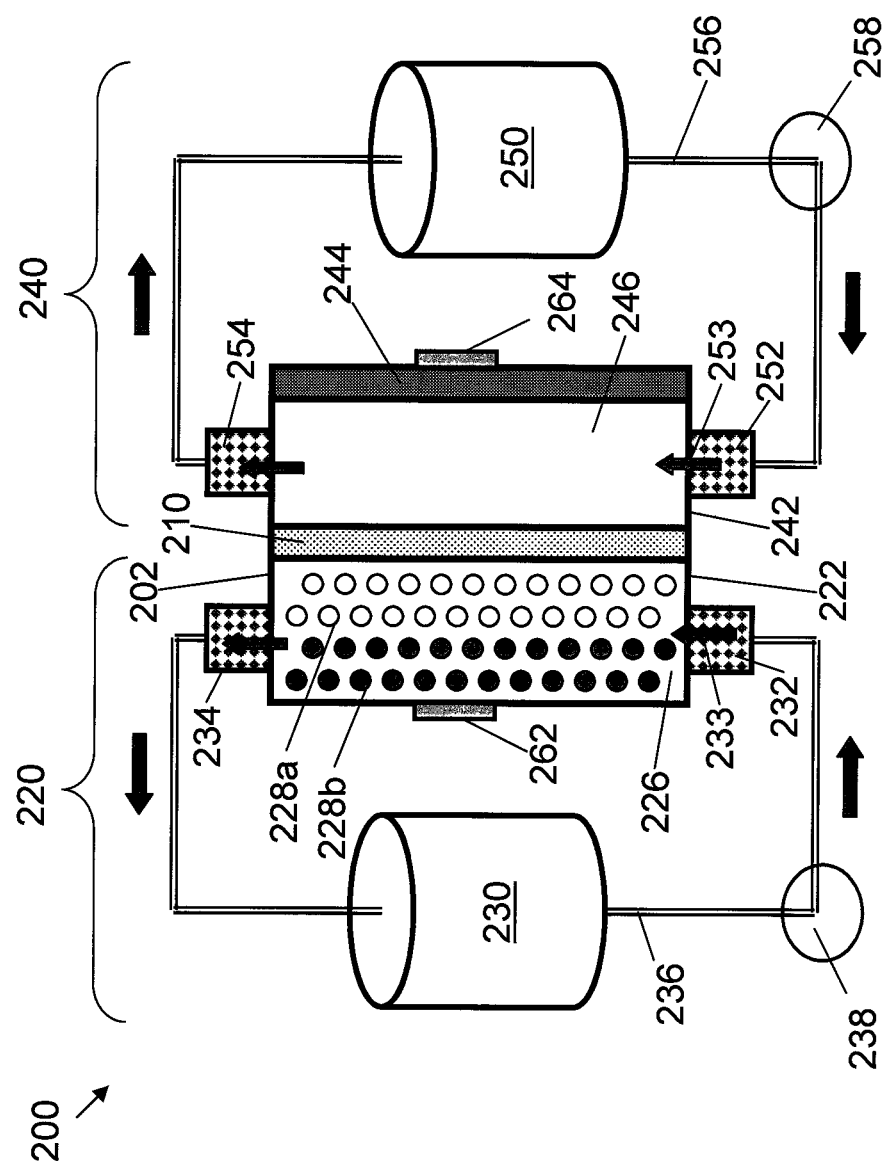
Figures 3A, 3B:
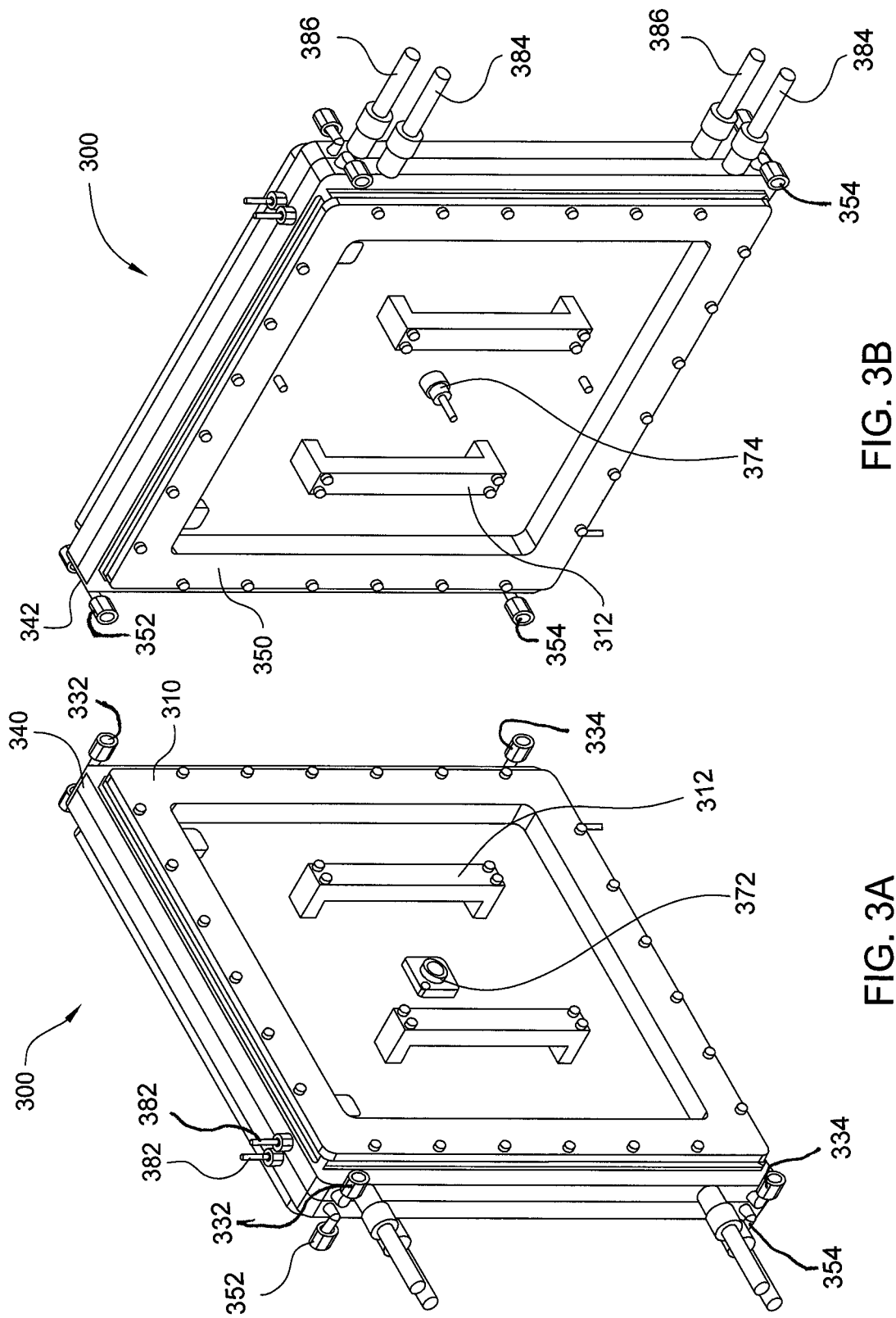
FIGS. 3A-3F depict a flow battery cell assembly which may be incorporated into a flow battery system, as described by embodiments herein.
Figure 3C:
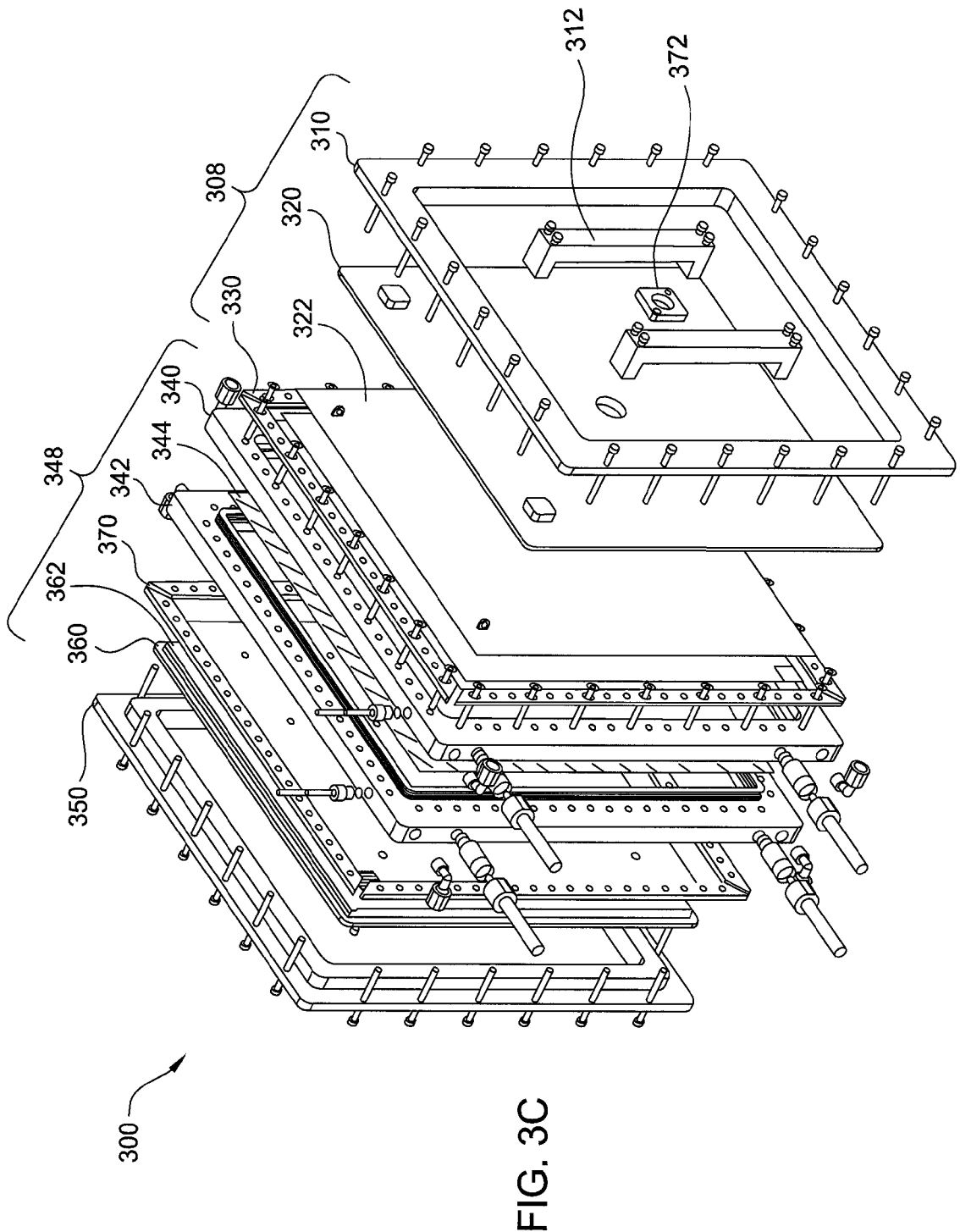
Figure 3D:
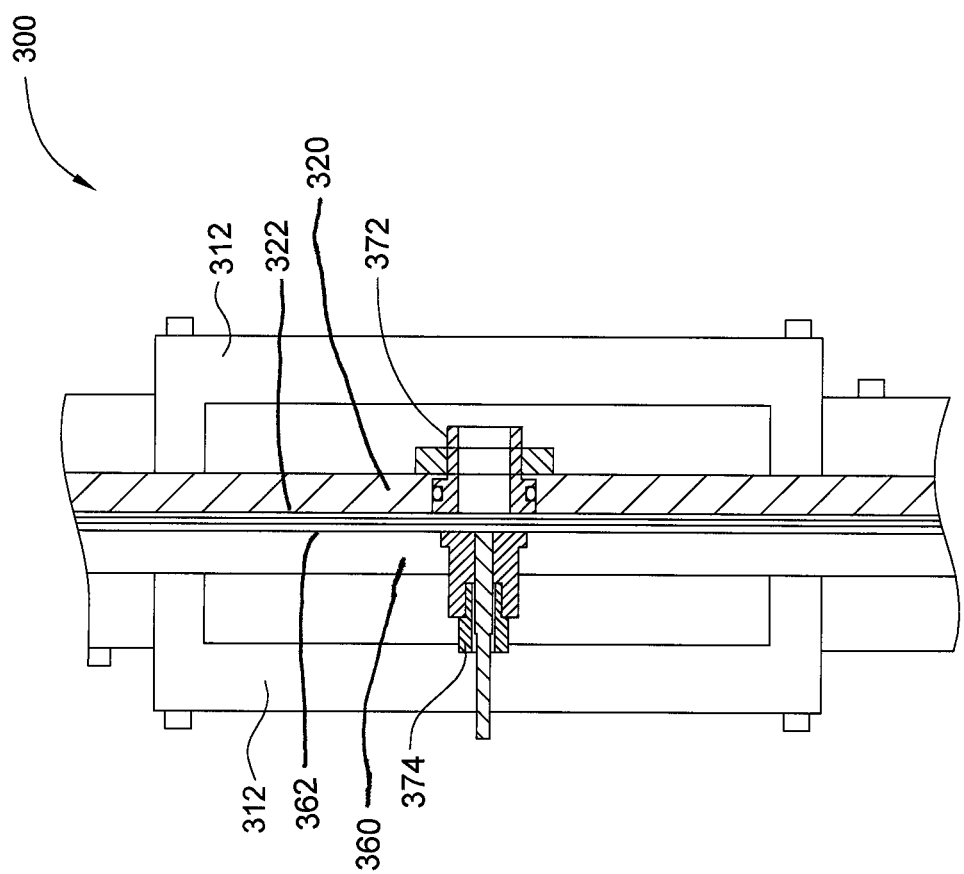
Figure 3F:
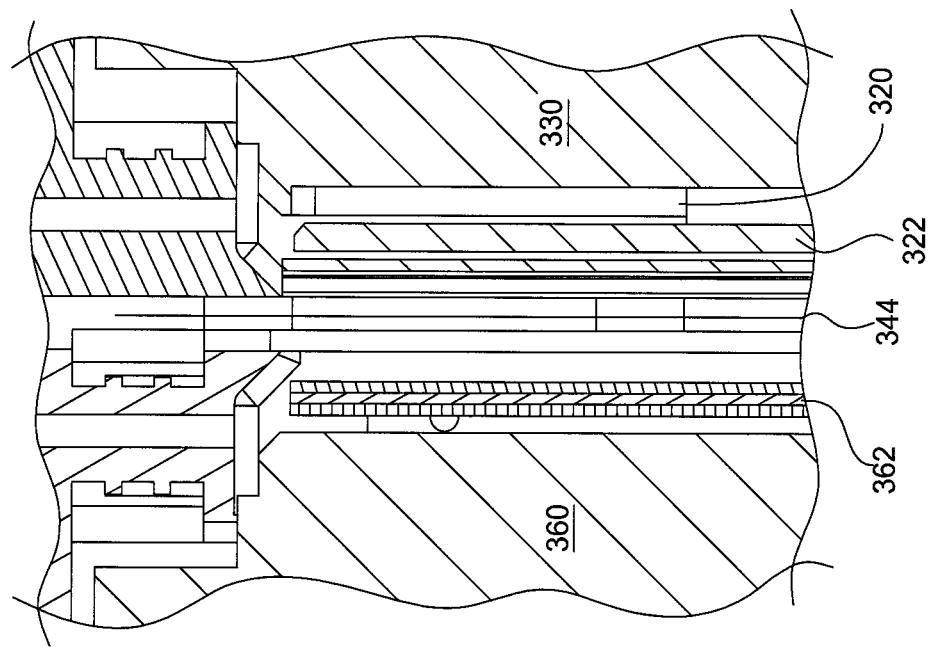
Figure 3E:
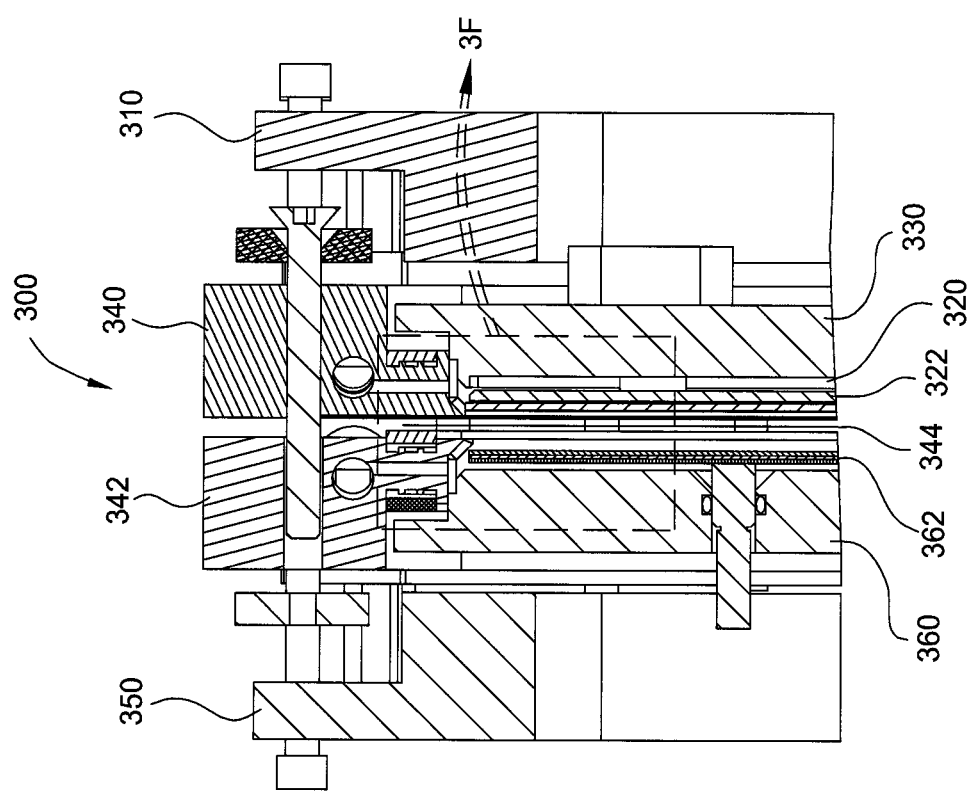

In another embodiment, FIGS. 2G-2I depict cathodic half cell 222 containing four rows of cathodic wires 228, such as two rows of cathodic wires 228a and two rows of cathodic wires 228b, as described by other embodiments herein. FIG.

2G depicts four staggered rows of cathodic wires 228 exposed to catholyte within catholyte pathway 233. The four rows of cathodic wires 228 extend along catholyte pathway 233 while each individual cathodic wire 228 extends perpendicular or substantially perpendicular to catholyte pathway 233. Each of the four rows of cathodic wires 228 is independently coupled with and in electrical contact to an independent contact bar (not shown) similar to contact bars 229a or 229b.

Therefore, each row of the cathodic wires 228 may be independently connected (energized) or disconnected (non-energized) electrically from the cathodic contact 262 via contact bars. A controller and/or a set of switches (not shown) are coupled between and in electrical communication to the cathodic contact 262 and each of the contact bars. The controller and/or the set of switches may be used to independently control by electrically connecting/disconnecting each of the contact bars—and therefore each row of the cathodic wires 228—to the cathodic contact 262. In some configurations, the controller and/or the set of switches may be used to independently control charge and/or discharge each row of the cathodic wires 228. Once in electrical contact with cathodic contact 262, the cathodic wires 228 within all four rows are capable of being plated/deplated during charge/discharge cycles.

FIGS. 2H-2I illustrate a first array of electrodes containing two staggered rows of cathodic wires 228a which are closest to the electrolyte membrane 210, and a second array of electrodes containing two staggered rows of cathodic wires 228b which are furthest from the electrolyte membrane 210. FIG. 2H depicts both rows of cathodic wires 228b in the first array as deplating during the discharge of the flow battery cell 202, while both rows of cathodic wires 228a in the second array remain electrically disconnected from the cathodic contact 262. Alternatively, FIG. 2I depicts both rows of cathodic wires 228a in the first array as deplating during the discharge of the flow battery cell 202, while both rows of cathodic wires 228b in the second array remain electrically disconnected from the cathodic contact 262. In either scenario, once the flow battery cell 202 is producing power below the predetermined minimum threshold, both rows of charged electrodes—cathodic wires 228b (FIG. 2H) or cathodic wires 228a (FIG. 2I) are placed in electrical contact to the cathodic contact 262 by contact bars, as described above.

In many of the embodiments described herein, the flow battery cell 202 operates at a high overall current density by simultaneously energizing multiple rows of cathodic wires 228 thereby lowering the localized plating current density of the plated metal on each cathodic wire 228. The overall current density of the flow battery cell 202 is the total current density across the membrane. The localized plating current density of the cathodic wires 228 is the current density of a single row of cathodic wires 228. The localized plating current density of a plurality of cathodic wires 228 varies to the quantity of the cathodic wires 228 as well as the diameter of the cathodic wires 228. In one embodiment, cathodic half cell 222 has a single row of cathodic wires 228 (FIGS. 2A-2B) which may produce an overall current density—which is equivalent to the localized plating current density of the one row of cathodic wires 228—within a range from about 1 mA/cm$^2$ to about 40 mA/cm$^2$, such as from about 5 mA/cm$^2$ to about 30 mA/cm$^2$, for example, about 20 mA/cm$^2$. In another example, cathodic half cell 222 has two rows of cathodic wires 228 (FIGS. 2C-2F) which may produce an overall current density within a range from about 5 mA/cm$^2$ to about 60 mA/cm$^2$, such as from about 10 mA/cm$^2$ to about 50 mA/cm$^2$, for example, about 40 mA/cm$^2$. In another example, cathodic half cell 222 has four rows of cathodic wires 228 (FIGS. 2G-2I) which may produce an overall current density within a range from about 10 mA/cm$^2$ to about 120 mA/cm$^2$, such as from about 20 mA/cm$^2$ to about 100 mA/cm$^2$, for example, about 80 mA/cm$^2$.

In embodiments described herein, flow battery systems 200 and flow battery cells 202 utilize at least one row and usually multiple rows of cathodic wires 228 within the cathodic half cell 222. A reduction of cost and size are among many advantages provided by cathodic wires 228. From a cost perspective, it is generally beneficial to keep the surface area of certain components within a flow battery as small as possible, especially for the higher cost components. Some of these high cost components include redox electrodes (e.g., nickel foam) which may be utilized as the anode 244 as well as membranes which may be useful as the electrolyte membrane 210. The flow multiple rows of cathodic wires 228, where each row of cathodic wires 228 contains a small volume of metal relative to the provided localized plating current density.

For example, a traditional planar cathode within a flow battery may have a localized plating current density of about 40 mA/cm$^2$ on the cathode if the plating rate is set to about 40 mA/cm$^2$—therefore—the overall current density through the membrane is also about 40 mA/cm$^2$. However, in one example described herein, a flow battery system 200 may have two rows of cathodic wires 228, such that each row of cathodic wires 228 has the same surface area as the traditional planar electrode. The two rows of cathodic wires 228 with twice the surface area may be plated simultaneously at the same rate of about 40 mA/cm$^2$ to produce an overall current density (e.g., across electrolyte membrane 210) of about 80 mA/cm$^2$. Therefore, in this example, a flow battery system 200 may contain half as many flow battery cells 202 to produce the same power as from a conventional flow battery containing traditional planar cathodes. The conventional flow battery may require two battery cells with battery cell containing a traditional planar cathode in order to provide about 80 mA/cm$^2$. However, in this example, a flow battery system 200 may contain only one flow battery cell 202 while providing an overall current density of about 80 mA/cm$^2$. Therefore, flow battery system 200 may provide equivalent power—as the conventional flow battery containing traditional planar cathodes—while only using half the electrolyte membrane and redox electrode surface areas as well as other expensive components.

In many embodiments, each of the cathodic wires 228 may have the same or substantially the same length as the height of the flow battery cell 202. Each of the cathodic wires 228 may independently have a length within a range from about 5 cm to about 300 cm. In some examples, each of the cathodic wires 228 may independently have a length within a range from about 10 cm to about 50 cm, such as from about 20 cm to about 30 cm. In other examples, each of the cathodic wires 228 may independently have a length within a range from about 20 cm to about 200 cm, or from about 50 cm to about 100 cm. The cathodic wires may have a diameter within a range from about 0.001 inch to about 0.1 inch, such as, from about 0.005 inch to about 0.05 inch, or such as, from about 0.01 inch to about 0.04 inch, or such as, from about 0.02 inch to about 0.03 inch, for example, about 0.012 inch, 0.024 inch or 0.036 inch.

In another embodiment, the flow battery cell 202 is configured to improve metal plating uniformity due to the dimensions of the cathodic half cell 222 which provides an increased velocity for a given volumetric fluid velocity of the catholyte 226 along catholyte pathway 233. In many configurations, the cathodic half cell 222 may have the length greater than the height along the catholyte pathway 233 and the height greater than the width along the catholyte pathway 233. This increased volumetric flow rate in turn provides minimal depletion of bulk level of chemistry across the length of catholyte pathway 233. The concentration of catholyte 226 stays substantially constant while metal is plating on the cathodic wires 228. Therefore, flow battery cell 202 has a longer length along the flow direction of catholyte pathway 233 than a width, which results in the highest fluid velocities for a given volumetric flow rate. The width of cathodic half cell 222 across catholyte pathway 233 (e.g., normal the length and height) may be within a range from about 1 mm to about 20 mm, such as, from about 5 mm to about 15 mm, for example, about 10 mm. The length of cathodic half cell 222 along catholyte pathway 233 (e.g., between catholyte inlet 232 and catholyte outlet 234) may be within a range from about 5 cm to about 300 cm, such as, from about 20 cm to about 200 cm, such as, from about 50 cm to about 100 cm. The height of cathodic half cell 222 along catholyte pathway 233 (e.g., between bottom and top portions 212 and 214) may be within a range from about 5 cm to about 300 cm, such as, from about 20 cm to about 200 cm, such as, from about 50 cm to about 100 cm. In one example, cathodic half cell 222 may have a length of about 200 cm, a height of about 10 cm, and a width of about 10 mm. In another example, cathodic half cell 222 may have a length of about 100 cm, a height of about 20 cm, and a width of about 10 mm.

In most embodiments, catholyte 226 is a liquid electrolyte, such as an aqueous based electrolyte. In some examples, catholyte 226 may be a zinc electrolyte. In one example, the catholyte for a zinc/ferrocyanide battery is alkaline. The catholyte may contain a hydroxide concentration within a range from about 1 N to about 7 N, such as from about 2 N to about 5 N. The hydroxide may be sodium hydroxide or potassium hydroxide and may be saturated with zincate. In some examples, the catholyte 226 may be saturated or supersaturated, such that zincate precipitates in the bath forming solid suspensions.

Outside of flow battery cell 202, catholyte 226 circulates between cathodic half cell 222 and catholyte source tank 230 by conduits 236. Conduits 236 extend between catholyte source tank 230 to catholyte inlet 232 and from catholyte outlet 234 to catholyte source tank 230. One or multiple pumps, such as pump 238, may be incorporated within flow battery system 200 to help flow catholyte 226 to and from cathodic half cell 222. In some examples, pump 238 may be disposed between catholyte source tank 230 and catholyte inlet 232 and connected therebetween by conduits 236. In other examples, pump 238 may be disposed between catholyte source tank 230 and catholyte outlet 234 and connected therebetween by conduits 236. Therefore, in one specific example, catholyte 226 may circulate within the cathodic side 220 of flow battery system 200 by flowing from catholyte source tank 230, through conduits 236, through catholyte inlet 232, along catholyte pathway 233 and around the cathodic wires 228 within cathodic half cell 222, through catholyte outlet 234, through conduits 236, and back to catholyte source tank 230. Catholyte 226 may have a forward flow (as depicted in FIGS. 2A, 2C, 2E, and 2G-2I with arrows) or may have a reverse flow during different time periods of the charge/discharge cycles. The fluid velocity of catholyte 226 may be within a range from about 1 cm/sec to about 25 cm/sec, such as from about 2 cm/sec to about 15 cm/sec, for example, about 5 cm/sec or about 10 cm/sec.

Anodic half cell 242 is on the anodic side 240 of flow battery system 200 and contains anode 244, which may be in fluid and/or conductive communication with anolyte 246. Anolyte 246 may be a liquid electrolyte, such as an aqueous based electrolyte or a solid electrolyte. In embodiments when anolyte 246 is a liquid anolyte, anolyte 246 flows into anolyte inlet 252 disposed on anodic half cell 242, along anolyte pathway 253, and out from anolyte outlet 244 disposed on anodic half cell 242. Anolyte pathway 253 extends between anolyte inlet 252 and anolyte outlet 254, as well as between anode 244 and electrolyte membrane 210 within anodic half cell 242.

Outside of flow battery cell 202, in embodiments when anolyte 246 is a liquid anolyte, anolyte 246 circulates between anodic half cell 242 and anolyte source tank 250 by conduits 256. Conduits 256 extend between anolyte source tank 250 to anolyte inlet 252 and from anolyte outlet 254 to anolyte source tank 250. One or multiple pumps, such as pump 258, may be incorporated within flow battery system 200 to help flow anolyte 246 to and from anodic half cell 242. In some examples, pump 258 may be disposed between anolyte source tank 250 and anolyte inlet 242 and connected therebetween by conduits 256. In other examples, pump 258 may be disposed between anolyte source tank 250 and anolyte outlet 234 and connected therebetween by conduits 256. Therefore, in one specific example, anolyte 246 may circulate within the anodic side 240 of flow battery system 200 by flowing from anolyte source tank 250, through conduits 256, through anolyte inlet 252, along anolyte pathway 253 within anodic half cell 242, through anolyte outlet 254, through conduits 256, and back to anolyte source tank 250. Anolyte 246 may have a forward flow (as depicted in FIGS. 2A, 2C, 2E, and 2G-2I with arrows) or may have a reverse flow during different time periods of the charge/discharge cycles. The fluid velocity of anolyte 246 may be within a range from about 1 cm/sec to about 25 cm/sec, such as from about 2 cm/sec to about 15 cm/sec, for example, about 5 cm/sec or about 10 cm/sec.

In some embodiments, anolyte 246 may be a solid anolyte, and therefore, certain portions or elements of the anodic side 240, as depicted in FIG. 2A, may be optional or absent portions or derivatives thereof, such as anolyte inlet 252, anolyte outlet 254, anolyte source tank 250, conduits 256, and/or pump 258. A solid anolyte 246 may have a thickness within a range from about 0.2 mm to about 5 mm, or from about 0.5 mm to about 3 mm, such as about 1 mm or about 2 mm.

In some examples, anolyte 246 may be an Fe(II)/Fe(III) electrolyte, such as a ferro/ferricyanide electrolyte. Anolyte 246 may initially contain a ferrocyanide compound which is oxidized to the respective ferricyanide compound during a recharge of the battery or cell. Several exemplary ferrocyanide compounds that may be contained within the anolyte 246 include sodium ferrocyanide, such as tetrasodium hexacyanoferrate decahydrate ($Na_4Fe(CN)_6 \cdot 10H_2O$), also known as yellow prussiate of soda, available from ScienceLab.com, as well as potassium ferrocyanide, such as tetrapotassium hexacyanoferrate decahydrate ($K_4Fe(CN)_6 \cdot 10H_2O$). Anolyte 246 generally contains hydroxide and additional hydroxide solution may be added to the anolyte 246 during the charge/discharge cycles in order to maintain a desired hydroxide concentration. The aqueous hydroxide solution generally contains sodium hydroxide, potassium hydroxide, or mixtures thereof.

Anode 244, such as a redox electrode, may have a variety of geometries, such as a flat planar anode, a planar anode, a plate anode, a cylindrical anode, or the like. Anode 244 may be may be solid, or may have a high surface area configuration, such as being porous, expanded or foamed. Usually, anode 244 contains nickel, iron, chromium, steel, stainless steel, graphite, alloys thereof, derivatives thereof, or combinations thereof. Anode 244 may be plated or coated with another material or metal, such as a graphite anode coated or plated with nickel or a nickel alloy. In one example, anode 244 is a planar electrode and contains stainless steel. In another example, anode 244 is porous, foamed, or expanded and contains nickel or a nickel alloy, such as nickel foam, expanded nickel, perforated nickel, nickel wire, or woven nickel wire. In another example, anode 244 contains graphite, such as porous graphite, graphite foam, nickel plated graphite foam, graphite felt, nickel plated graphite felt, or derivatives thereof. In some embodiments, anode 244 may have a length within a range from about 5 cm to about 300 cm, such as from about 10 cm to about 50 cm, such as from about 20 cm to about 30 cm and may have a height within a range from about 5 cm to about 300 cm, such as from about 10 cm to about 50 cm, such as from about 20 cm to about 30 cm. Additionally, anode 244 may have a thickness within a range from about 0.5 mm to about 5 mm, such as from about 1 mm to about 3 mm.

Electrolyte membrane 210 is disposed between cathodic half cell 222 and anodic half cell 242 and in contact with both catholyte 226 and anolyte 246. Electrolyte membrane 210 may be an exchange membrane, a separator, or the like which isolates catholyte 226 and anolyte 246. In many embodiments, electrolyte membrane 210 is an ionic exchange membrane—such as a cationic exchange membrane—which is semipermeable to some cations (e.g., Na+ or K+) which migrate through electrolyte membrane 210 between the anolyte 246 and catholyte 226. Electrolyte membrane 210 may contain or be made from an ionic resin and/or a polymeric, co-polymeric, or oligomeric material, such as polytetrafluoroethylene, polyvinyl, polystyrene, polyethylene, polypropylene, polyester, derivatives thereof, or combinations thereof. Generally, electrolyte membrane 210 is durable and has high ionic conductivity and chemical stability. In one example, electrolyte membrane 210 contains a polymeric backbone of PTFE, such as NAFION® 112, 115, 117, and 424 membranes, which are commercially available from DuPont. In another example, electrolyte membrane 210 contains a co-polymer of tetrafluoroethylene and a vinylene monomer, such as a XUS® membrane, which is commercially available from Dow Chemical Company. Electrolyte membrane 210 may have a thickness within a range from about 0.005 mm to about 0.5 mm. In some examples, electrolyte membrane 210 may have a thickness of about 0.015 mm. In an alternative embodiment, electrolyte membrane 110 may be a separator, such as a ribbed separator, formed from a polymeric material and precipitated silica, such that the internal structure is very porous, tortuous, and hydrophilic (e.g., hydrophilic porous plastic separator), which is commercially available from the AMER-SIL company.

Cathodic contact 262 and anodic contact 264 may be coupled to or otherwise in electrical contact with for discharging or removing the stored power from flow battery cell 202 while in use, or alternatively, for charging or storing power to flow battery system 200. Each flow battery cell 202 may be electrically connected (e.g., in parallel or in series) by cathodic contacts 262 and anodic contacts 264 to form the desirable circuit for flow battery system 200. In one example, the plurality of flow battery cells 202 may be electrically connected in series in order to have constant amperage and increased voltage for flow battery system 200. Alternatively, the plurality of flow battery cells 202 may be electrically connected in parallel in order to have constant voltage and increased amperage for flow battery system 200.

Flow battery system 200 is illustrated having just one flow battery cell 202, however, flow battery system 200 often contains multiple cells similar to flow battery cell 202. The specific quantity of flow battery cells 202 may be determined based on the total capacity of each flow battery cell 202 and the relative total desired energy capacity for the overall flow battery system 200. A plurality of flow battery cells 202 may be connected together for storing the total desired energy capacity.

FIGS. 3A-3F depict a flow battery cell 300 which may be incorporated into a flow battery system, such as flow battery systems 100, 200, 400, and 600 described in embodiments herein. Flow battery cell 300 contains cathodic half cell 308 and anodic half cell 348 separated by electrolyte membrane 344. Electrolyte membrane 344 is disposed between membrane support frames 340 and 342 and maintains the catholyte and the anolyte separate from each other.

Cathodic half cell 308 contains electrode plate retainer 310 coupled with screw plate frame 330 coupled with membrane support frame 340. Cathode 322 coupled with cathode support plate 320 are both disposed between electrode plate retainer 310 and screw plate frame 330. Cathode support plate 320 contains or is made of an electrically insulating material, such as, a polymeric or oligomeric material. Cathodic half cell 308 may have one, two, or more catholyte inlets 332 and may have one, two, or more catholyte outlets 334. Catholyte inlets 332 and catholyte outlets 334 are coupled to membrane support frame 340 and are in fluid communication with the catholyte pathways extending through the cavity formed within cathodic half cell 308. Catholyte flows from the catholyte inlet 332 to the catholyte outlet 334 along a catholyte pathway while exposing cathode 322. A thermometer 382 is coupled with and passes through membrane support frame 340 and is in physical and/or thermal contact with the catholyte flowing through the catholyte pathway within cathodic half cell 308. Cathodic half cell 308 optionally contains catholyte reference electrodes 386, such as mercury oxide electrodes, which are exposed to the catholyte.

In one embodiment, cathode 322 may be a plate, planar, or flat cathode which contains a material such as graphite or a metal, such as nickel, iron, chromium, stainless steel, zinc, cadmium, lead, mercury, alloys thereof, or combinations thereof. In other embodiments, the various cathodes described in embodiments herein may be utilized as cathode 322, such as planar cathode 124 in combination with open block flow screen 160, cathodic wires 228, cathodic wire assembly 500, slotted sheet cathode 660, or derivatives thereof.

Anodic half cell 348 contains electrode plate retainer 350 coupled with screw plate frame 370 coupled with membrane support frame 342. Anode 362 coupled with anode support plate 360 are both disposed between electrode plate retainer 350 and screw plate frame 370. Anode support plate 360 contains or is made of an electrically insulating material, such as, a polymeric or oligomeric material.

Anodic half cell 348 may have one, two, or more anolyte inlets 352 and may have one, two, or more anolyte outlets 354. Anolyte inlets 352 and anolyte outlets 354 are coupled to membrane support frame 342 and are in fluid communication with the anolyte pathways extending through the cavity formed within anodic half cell 348. Anolyte flows from the anolyte inlet 352 to the anolyte outlet 354 along a catholyte pathway while exposing anode 362. A thermometer 382 is coupled with and passes through membrane support frame 342 and is in physical and/or thermal contact with the anolyte flowing through the anolyte pathway within anodic half cell 348. Anodic half cell 348 optionally contains anolyte reference electrodes 384, such as mercury oxide electrodes, which are exposed to the anolyte.

Anode 362, such as a redox electrode, may have a variety of geometries, such as a flat planar anode, a planar anode, a plate anode, a cylindrical anode, or the like. Anode 362 may be may be solid, or may have a high surface area configuration, such as being porous, expanded or foamed. Usually, anode 362 contains nickel, iron, chromium, steel, stainless steel, graphite, alloys thereof, derivatives thereof, or combinations thereof. Anode 362 may be plated or coated with another material or metal, such as a graphite anode coated or plated with nickel or a nickel alloy. In one example, anode 362 is a planar electrode and contains stainless steel. In another example, anode 362 is porous, foamed, or expanded and contains nickel or a nickel alloy, such as nickel foam, expanded nickel, perforated nickel, nickel wire, or woven nickel wire. In another example, anode 362 contains graphite, such as porous graphite, graphite foam, nickel plated graphite foam, graphite felt, nickel plated graphite felt, or derivatives thereof. In some embodiments, anode 362 may have a length within a range from about 5 cm to about 300 cm, such as from about 10 cm to about 50 cm, such as from about 20 cm to about 30 cm and may have a height within a range from about 5 cm to about 300 cm, such as from about 10 cm to about 50 cm, such as from about 20 cm to about 30 cm. Additionally, anode 362 may have a thickness within a range from about 0.5 mm to about 5 mm, such as from about 1 mm to about 3 mm.

Cathodic contact 372 is in electrical contact with cathode 332 and anodic contact 374 is in electrical contact with anode 362. In some embodiments, cathodic contact 372 may be directly attached to cathode 332 and anodic contact 374 may be directly attached to anode 362. Alternatively, controllers, switches, electrical contacts, and/or other circuitry may be coupled with and/or between cathodic contact 372 and cathode 332 or may be coupled with and/or between anodic contact 374 and anode 362. In some examples, cathodic contact 372 may pass through an opening in the middle of cathode support plate 320 and be in physical and electrical contact with cathode 332. Similarly, anodic contact 374 may pass through an opening in the middle of anode support plate 360 and be in physical and electrical contact with anode 322.

In an alternative embodiment, a bipolar plate (not shown) may be substituted for both cathodic contact 372 and anodic contact 374 and disposed on any outside surface of each flow battery cell 300. Each bipolar plate contains a cathodic contact which extends between the inside and outside of and in electrical contact with the cathodic half cell 308 and also contains an anodic contact which extends between the inside and outside of and in electrical contact with the anodic half cell 348. The bipolar plates may provide alternative configurations when stacking or otherwise positioning a plurality of flow battery cells 300 to form a flow battery system.

FIGS. 3A-3D illustrate handles attached to cathode support plate 320 and anode support plate 360. Handles 312 may be attached to the flow battery cell 300 at numerous positions wherein multiple flow battery cells 300 may be stacked or otherwise efficiently positioned without being obstructed by the handles 312. Optionally, the handles 312 may be removed upon positioning flow battery cells 300 or simply omitted from the flow battery cell 300.

Figure 4:
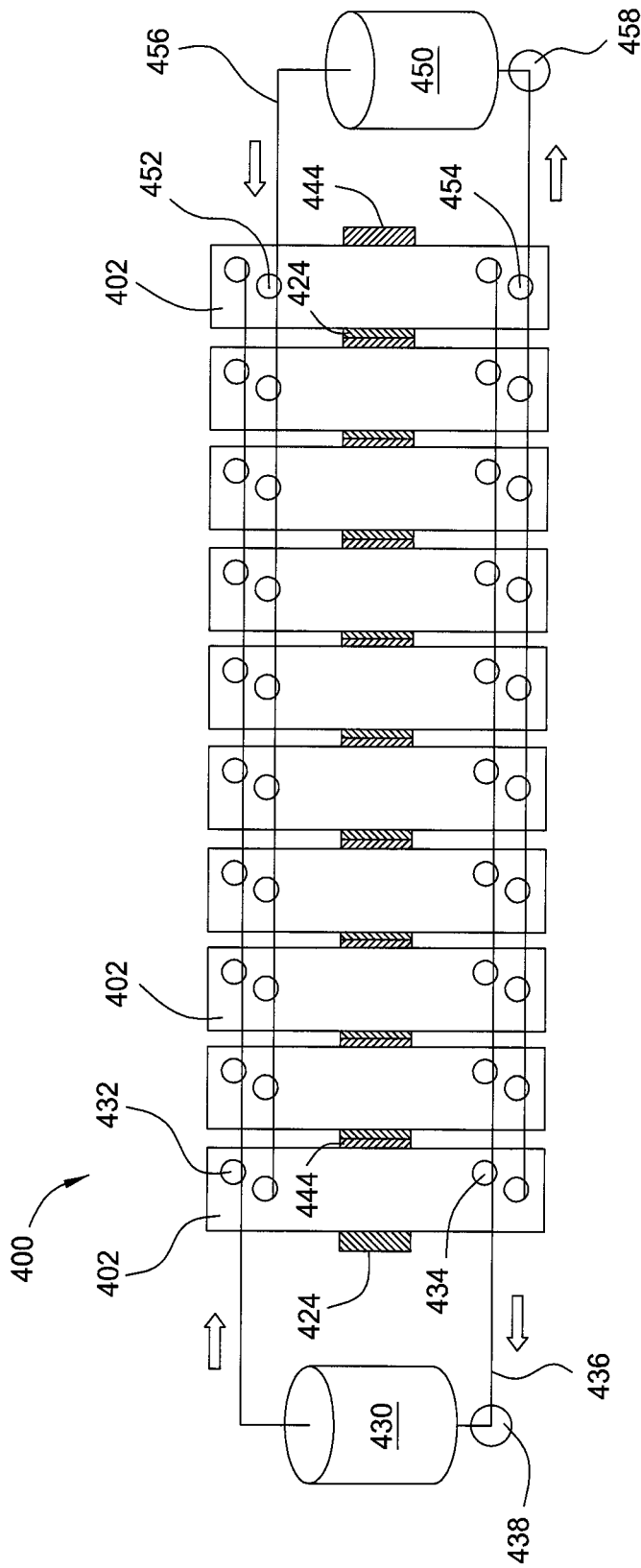
FIG. 4 depicts a flow battery system containing a plurality of variety of battery cells, as described by embodiments herein.

FIG. 4 depicts a flow battery system 400 containing a plurality of flow battery cells 402 as described by another embodiment. Although flow battery system 400 is illustrated with 10 flow battery cells, however, flow battery system 400 may contain a single flow battery cell 402 or may contain any number of flow battery cells 402 dependent to desired storage capacity for electrical power. The particular number of flow battery cells 402 may be determined based on the total capacity of each flow battery cell 402 and the relative total desired energy capacity for the overall flow battery system 400. In many embodiments, flow battery system 400 contains 2 or more flow battery cells 402, such as 3, 4, 6, 8, 10, 12, 20, 24, 30, 40, 50, 80, 100, or more flow battery cells 402.

In other embodiments, one or multiple flow battery cells 402 may be replaced with one or multiple flow battery cells 102, 202, 300, 602, or mixtures thereof, as described by embodiments herein. Therefore, flow battery system 400 may contain a plurality of flow battery cells which includes any number of flow battery cells 102, 202, 300, 402, or 602 incorporated into a single system. In another embodiment, flow battery cells 102, 202, 300, 402, and/or 602 may be positioned and/or rotated to be disposed in a variety of positions to assembly flow battery system 400, flow battery systems 100, 200, or 600 described herein, as well as other flow battery systems. For example, flow battery cells 102 (FIGS. 1A-1B), 202 (FIGS. 2A-2I), and 602 (FIGS. 6A-6B) are depicted as having horizontal flow paths for the catholyte and the anolyte. The horizontal flow paths extend between the respective inlets and outlets within each flow battery cell at a horizontal direction relative to gravity, such as being perpendicular or substantially perpendicular to the gravitational force. Alternatively, flow battery cells 300 (FIGS. 3A-3F) and 402 (FIG. 4) are depicted as having vertical flow paths for the catholyte and the anolyte. The vertical flow paths extend between the respective inlets and outlets within each flow battery cell at a vertical direction relative to gravity, such as being parallel or substantially parallel with the gravitational force. However, flow battery cells 102, 202, 300, 402, and/or 602 are not limited at being positioned to have horizontal or vertical flow paths for the electrolytes and may be positioned and/or rotated at any angle.

Each of the flow battery cells 402 is in fluid communication with catholyte source tank 430 and anolyte source tank 450 by a conduit system. In some embodiments, the catholyte circulates between each of the cathodic half cells within flow battery cells 402 and catholyte source tank 430 by conduits 436, similar as the anolyte circulates between each of the anodic half cells within flow battery cells 402 and anolyte source tank 450 by conduits 456. Conduits 436 extend between catholyte source tank 430 to catholyte inlet 432 and from catholyte outlet 434 to catholyte source tank 430, similar as conduits 456 extend between anolyte source tank 450 to anolyte inlet 452 and from anolyte outlet 454 to anolyte source tank 450. Pumps 438 and 458 may be incorporated within flow battery system 400 to help flow the catholyte and anolyte to and from the respective half cell with each flow battery cell 402.

The catholyte may have a forward flow (as depicted in FIG. 4 with arrows) through conduits 436 or may have a reverse flow during different time periods of the charge/discharge cycles. The fluid velocity of the catholyte may be within a range from about 1 cm/sec to about 25 cm/sec, such as from about 2 cm/sec to about 15 cm/sec, for example, about 5 cm/sec or about 10 cm/sec. Therefore, in one specific example, the catholyte may circulate within the cathodic side of flow battery system 400 by flowing from catholyte source tank 430, through conduits 436, through catholyte inlet 432 and into the cathodic half cell, out of the cathodic half cell by catholyte outlet 434, through conduits 436, and back to catholyte source tank 430.

The anolyte may have a forward flow (as depicted in FIG. 4 with arrows) through conduits 456 or may have a reverse flow during different time periods of the charge/discharge cycles. The fluid velocity of the anolyte may be within a range from about 1 cm/sec to about 25 cm/sec, such as from about 2 cm/sec to about 15 cm/sec, for example, about 5 cm/sec or about 10 cm/sec. In another specific example, the anolyte may circulate within the anodic side of flow battery system 400 by flowing from anolyte source tank 450, through conduits 456, through anolyte inlet 452 and into the anodic half cell, out of the anodic half cell by anolyte outlet 454, through conduits 456, and back to anolyte source tank 450.

Each of the flow battery cells 402 may have a cathodic contact 424 and an anodic contact 444. Cathodic contact 424 may be disposed on flow battery cell 402 and extends between the inside and outside of each cathodic half cell. Similarly, anodic contact 444 may be disposed on flow battery cell 402 and extends between the inside and outside of each anodic half cell.

Cathodic contact 424 and anodic contact 444 may be coupled to or otherwise in electrical contact with for discharging or removing the stored power from flow battery cell 402 while in use, or alternatively, for charging or storing power to flow battery system 400. Each flow battery cell 402 may be electrically connected (e.g., in parallel or in series) by cathodic contacts 424 and anodic contacts 444 to form the desirable circuit for flow battery system 400. As depicted in FIG. 4, the plurality of flow battery cells 402 may be electrically connected in series in order to have constant amperage and increased voltage for flow battery system 400. Alternatively, the plurality of flow battery cells 402 may be electrically connected in parallel in order to have constant voltage and increased amperage for flow battery system 400.

In an alternative embodiment, a bipolar plate (not shown) may be substituted for both cathodic contact 424 and anodic contact 444 and disposed on any outside surface of each flow battery cell 402. Each bipolar plate contains a cathodic contact which extends between the inside and outside of and in electrical contact with the cathodic half cell and also contains an anodic contact which extends between the inside and outside of and in electrical contact with the anodic half cell. The bipolar plates may provide alternative configurations when stacking or otherwise positioning a plurality of flow battery cells 402 to form a flow battery system 400.

FIGS. 5A-5C depict cathodic wire assembly 500, which may be incorporated into the flow battery systems as described herein, such as flow battery system 200. Cathodic wire assembly 500 contains frame 502 having an opening 504 and a plurality of cathodic wires 530 extending across opening 504. Frame 502 and opening 504 are both illustrated with rectangular or square geometries, but other geometries may independently be utilized for frame 502 and opening 504. Frame 502 contains frame body 506 encompassed by a protective shell 522. Frame body 506 may contain or be formed from a plastic material, such as a molded plastic, which may be a single piece of plastic material or multiple pieces adhered together. Protective shell 522 may contain or be formed from an elastomeric material or an oligomeric material, which may be a single piece of material or multiple pieces. Frame body 506 and protective shell may contain or be made from exemplary materials such as polyethylene, polypropylene, natural polypropylene (NPP), polyphenylene oxide (PPO), polyphenylene sulfide (PPS), polyvinyl chloride (PVC), polyvinylidene fluoride (PVDF), fluorinated ethylene propylene (FEP), perfluoroalkoxy (PFA), polytetrafluoroethylene (PTFE), as well as other fluoropolymers, derivatives thereof, or combinations thereof. Generally, natural polypropylene (NPP) is polypropylene containing no pigment or substantially no pigment and/or being unfilled or substantially unfilled.

Raised seal 524 may be disposed on frame 502 and used to form a tight fit or enclosure when cathodic wire assembly 500 is incorporated into a flow battery system. Raised seal 524 may be an o-ring or seal placed near the perimeter frame 502 or may be formed as an intimate portion of protective shell 522.

The plurality of cathodic wires 530 extends between sides 518 and 520 of frame 502 and across opening 504. FIG. 5A illustrates a single row of cathodic wires 530 containing 10 wires. In other embodiments, cathodic wire assembly 500 may contain 2 or more rows of cathodic wires 530 and may have any number of wires within each row. In some embodiments, cathodic wires 530 may be strung in a loop around a first headed pin 534 positioned on side 518 and a second headed pin 534 is positioned on side 520. Therefore, a single piece of wire may be utilized to form two cathodic wires 530 in some embodiments, while other embodiments provide that a single piece of wire may be utilized to form all of the cathodic wires 530. Alternatively, each cathodic wire 530 may be a single piece of wire attached to a headed pin 534 on each side of the wire. In one configuration, a first row of headed pins 534 extends along side 518 of the front side 510 of frame body 506 and a second row of headed pins 534 extends along side 520 of the front side 510 of frame body 506, as illustrated in FIGS. 5B-5C. In another configuration, a first row of headed pins 534 extends along side 518 of the back side 512 of frame body 506 and a second row of headed pins 534 extends along side 520 of the back side 512 of frame body 506, as illustrated in FIG. 5C.

In one embodiment, both rows of headed pins 534 on the front side 510 or back side 512 extend parallel or substantially parallel to each other and have the same amount of headed pins 534, such that each headed pin 534 in the first row is paired up with each consecutive headed pin 534 in the second row. Either one wire extends between each pair of headed pins 534 or a looped wire is strung around each pair of headed pins 534 to provide the cathodic wires 530. In another embodiment, two rows of headed pins 534 extend along side 518—one row on each of the front side 510 and the back side 512 and two rows of headed pins 534 extend along side 520—one row on each of the front side 510 and the back side 512, as illustrated in FIG. 5C. The cathodic wires 530 strung between the two rows of headed pins 534 extending along the front side 510 form a first array of cathodic wires 530 and the cathodic wires 530 strung between the two rows of headed pins 534 extending along the back side 512 form a second array of cathodic wires 530.

In one embodiment, the two rows or arrays of cathodic wires 530 are aligned relative to each other, as shown in FIG. 5C. Alternatively, in another embodiment not shown, the two rows or arrays of cathodic wires 530 are staggered, off-set, or otherwise unaligned relative to each other. A pair of staggered rows of cathodic wires 530 may be formed by staggering or off-setting the position of the headed pins 534 on the front side 510 relative to the position of the headed pins 534 on the back side 512.

Cathodic wires 530 may independently contain a metal, such as cadmium, iron, steel, stainless steel, nickel, chromium, silver, gold, platinum, palladium, platings thereof, alloys thereof, derivatives thereof, or combinations thereof. In some examples, cathodic wires 530 contain cadmium or a cadmium alloy. Cathodic wires 530 may be a solid cadmium wire, a solid cadmium alloy wire, a cadmium plated metallic wire, such as a steel or stainless steel wire plated with cadmium or a cadmium alloy. In many embodiments, the length of cathodic wires 530 may be within a range from about 10 cm to about 50 cm, such as from about 20 cm to about 30 cm. Cathodic wires 530 may have a diameter within a range from about 0.001 inch to about 0.1 inch, or such as, from about 0.005 inch to about 0.05 inch, or such as, from about 0.01 inch to about 0.04 inch, or such as, from about 0.02 inch to about 0.03 inch, for example, about 0.012 inch, 0.024 inch or 0.036 inch.

Contact bar 540 is coupled with and in electrical contact with each of the cathodic wires 530, as depicted in FIG. 5C. Contact bar 540 is configured to be in electrical contact with the cathodic contact of the flow battery cell. FIG. 5C illustrates contact bar 540 extending from the top 514 of frame 502, however, contact bar 540 may extend from the bottom 516, sides 518 and 520, front 510, and/or back 512 of frame 502 in order to make electrical contact with the cathodic contact of the flow battery cell. Contact bar 540 may be disposed within frame body 506 and/or between frame body 506 and protective shell 522. Contact bar 540 contains a conductive material, such as a metal. Contact bar 540 may be a wire, a plate, a bar, a ribbon, or similar contact/conductive surface. Contact bar 540 may contain iron, steel, stainless steel, copper, nickel, chromium, silver, gold, aluminum, cadmium, platinum, palladium, platings thereof, alloys thereof, derivatives thereof, or combinations thereof.

Figure 6A:
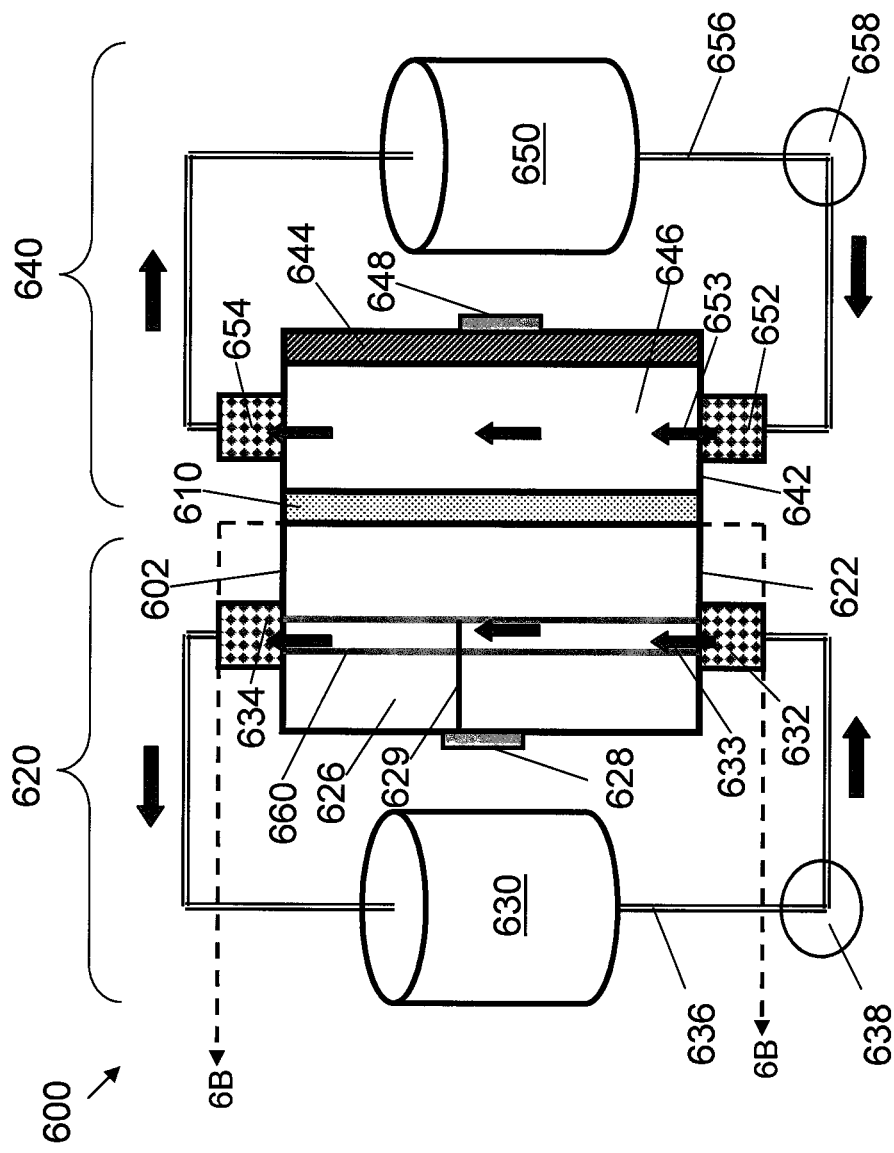
FIGS. 6A-6C depict a flow battery system containing a flow battery cell having a slotted sheet cathode, as described in one embodiment herein.
Figure 6B:
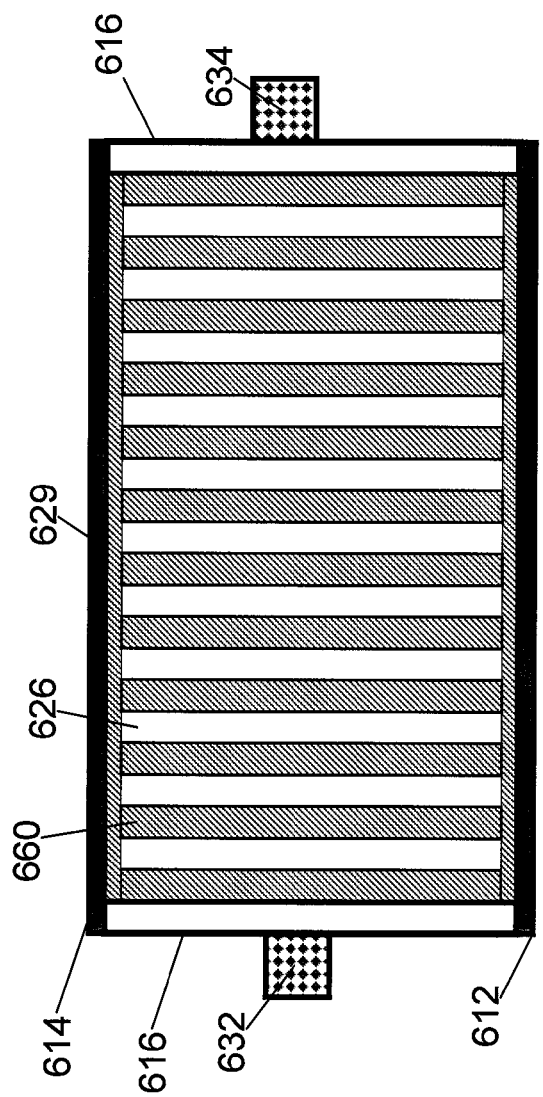
Figure 6C:
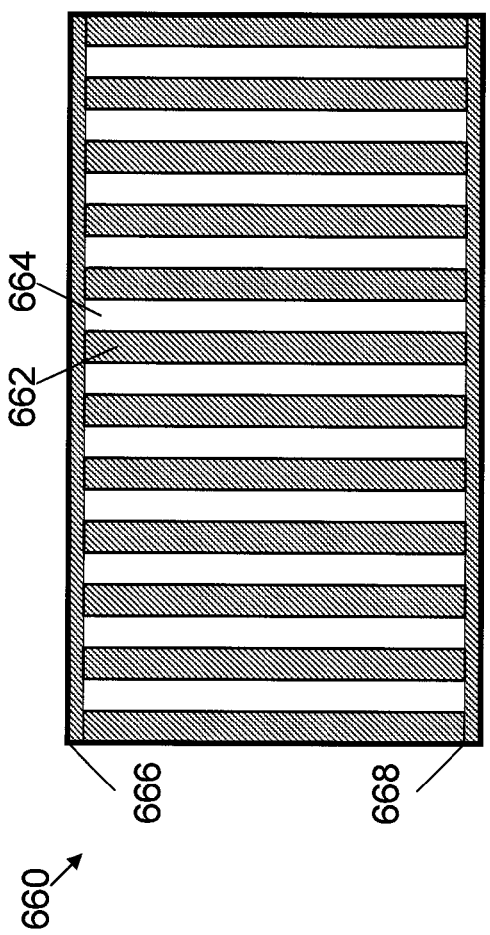

FIGS. 6A-6B depict a flow battery system 600 containing a flow battery cell 602 which has a cathodic half cell 622 and an anodic half cell 642 separated by electrolyte membrane 610, as described in multiple embodiments herein. Cathodic half cell 622 is on the cathodic side 620 of flow battery system 600 and has multiple slotted sheet cathodes 660, which extend through and are in fluid communication with catholyte 626 in catholyte pathway 633. The slotted sheet cathodes 660 extend perpendicular or substantially perpendicular to catholyte pathway 633 and each of the slotted sheet cathodes 660 extends parallel or substantially parallel to each other. Each slotted sheet cathode 660 contains a plurality of cathodic strips 662 separated by slots 664, as depicted in FIG. 6C.

FIGS. 6A-6B illustrate flow battery cell 602 containing two slotted sheet cathodes 660. However, in other configurations, flow battery cell 602 may have only one slotted sheet cathode 660, or may have multiple slotted sheet cathodes 660, such as 2, 3, 4, 5, 6, or more, such as 10, 20, or more. The slotted sheet cathodes 660 are disposed within the cathodic half cell 622 on the cathodic side 620 of flow battery system 600.

As depicted by FIG. 6B from the perspective of viewing across the width of the cathodic half cell 622 from the electrolyte membrane 610—the two slotted sheet cathodes 660 are aligned with each other such that the slotted sheet cathode 660 closest to the electrolyte membrane 610 completely overshadows the slotted sheet cathode 660 furthest from the electrolyte membrane 610. The cathodic strips 662 within the slotted sheet cathode 660 closest to the electrolyte membrane 610 form a first array of cathodic strips 662 and the cathodic strips 662 within the slotted sheet cathode 660 furthest from the electrolyte membrane 610 form a second array of cathodic strips 662.

Alternatively, in another embodiment not shown, the two slotted sheet cathodes 660 are staggered with each other such that the two slotted sheet cathodes 660 are unaligned relative to each other from the perspective of viewing across the width of the cathodic half cell 622 from the electrolyte membrane 610. Therefore, each row or array of cathodic strips 662 is also staggered relative to each other.

Catholyte 626 may be flowed into catholyte inlet 632 which is disposed on cathodic half cell 622, along catholyte pathway 633, and out from catholyte outlet 634 disposed on cathodic half cell 622. Catholyte pathway 633 extends between catholyte inlet 632 and catholyte outlet 634 within cathodic half cell 622. In most embodiments, catholyte 626 is a liquid electrolyte, such as an aqueous based electrolyte. In some examples, catholyte 626 may be a zinc electrolyte. In one example, the catholyte for a zinc/ferrocyanide battery is alkaline. The catholyte may contain a hydroxide concentration within a range from about 1 N to about 7 N, such as from about 2 N to about 5 N. The hydroxide may be sodium hydroxide or potassium hydroxide and may be saturated with zincate. In some examples, the catholyte 626 may be saturated or supersaturated, such that zincate precipitates in the bath forming solid suspensions.

Outside of flow battery cell 602, catholyte 626 circulates between cathodic half cell 622 and catholyte source tank 630 by conduits 636. Conduits 636 extend between catholyte source tank 630 to catholyte inlet 632 and from catholyte outlet 634 to catholyte source tank 630. One or multiple pumps, such as pump 638, may be incorporated within flow battery system 600 to help flow catholyte 626 to and from cathodic half cell 622. In some examples, pump 638 may be disposed between catholyte source tank 630 and catholyte inlet 632 and connected therebetween by conduits 636. In other examples, pump 638 may be disposed between catholyte source tank 630 and catholyte outlet 634 and connected therebetween by conduits 636. Therefore, in one specific example, catholyte 626 may circulate within the cathodic side 620 of flow battery system 600 by flowing from catholyte source tank 630, through conduits 636, through catholyte inlet 632, along catholyte pathway 633, across cathodic strips 662 and through slots 664 of slotted sheet cathode 660 within cathodic half cell 622, through catholyte outlet 634, through conduits 636, and back to catholyte source tank 630. Catholyte 626 may have a forward flow (as depicted in FIG. 6A with arrows) or may have a reverse flow during different time periods of the charge/discharge cycles. The fluid velocity of catholyte 626 may be within a range from about 1 cm/sec to about 25 cm/sec, such as from about 2 cm/sec to about 15 cm/sec, for example, about 5 cm/sec or about 10 cm/sec.

In another embodiment, the flow battery cell 602 is configured to improve metal plating uniformity due to the dimensions of the cathodic half cell 622 which provides an increased velocity for a given volumetric fluid velocity of the catholyte 626 along catholyte pathway 633. In many configurations, the cathodic half cell 622 may have the length greater than the height along the catholyte pathway 633 and the height greater than the width along the catholyte pathway 633. This increased volumetric flow rate in turn provides minimal depletion of bulk level of chemistry across the length of catholyte pathway 633. The concentration of the catholyte 626 stays substantially constant while metal is plating on the cathodic strips 662. Therefore, flow battery cell 602 has a longer length along the flow direction of catholyte pathway 633 than a width, which results in the highest fluid velocities for a given volumetric flow rate.

The width of cathodic half cell 622 across catholyte pathway 633 (e.g., normal the length and height) may be within a range from about 1 mm to about 20 mm, such as, from about 5 mm to about 15 mm, for example, about 10 mm. The length of cathodic half cell 622 along catholyte pathway 633 (e.g., between catholyte inlet 632 and catholyte outlet 634) may be within a range from about 5 cm to about 300 cm, such as, from about 20 cm to about 200 cm, such as, from about 50 cm to about 100 cm. The height of cathodic half cell 622 along catholyte pathway 633 (e.g., between bottom and top portions 612 and 614) may be within a range from about 5 cm to about 300 cm, such as, from about 20 cm to about 200 cm, such as, from about 50 cm to about 100 cm. In one example, cathodic half cell 622 may have a length of about 200 cm, a height of about 10 cm, and a width of about 10 mm. In another example, cathodic half cell 622 may have a length of about 100 cm, a height of about 20 cm, and a width of about 10 mm.

FIG. 6C depicts a slotted sheet cathode 660 which contains cathodic strips 662 separated by slots 664 and extending between the upper portion 666 and the lower portion 668 of slotted sheet cathode 660. Slotted sheet cathode 660 may contain or be formed from a metallic sheet (e.g., a stainless steel sheet) in which slots 664 have been disposed, stamped, cut, or otherwise formed there through or within. Each slotted sheet cathode 660 and cathodic strips 662 may contain or be formed from a metal such as iron, steel, stainless steel, cadmium, chromium, nickel, alloys thereof, or combinations thereof. In some examples, slotted sheet cathode 660 may be formed from a cadmium plated stainless steel sheet.

In many embodiments, the height of the slotted sheet cathode 660 may be the same, substantially the same, or shorter than the length of catholyte pathway 633 or the length of cathodic half cell 622. Therefore, the height of the slotted sheet cathode 660 may be within a range from about 5 cm to about 300 cm, such as, from about 20 cm to about 200 cm, such as, from about 50 cm to about 100 cm. Also, the slotted sheet cathode 660 may have a thickness within a range from about 0.005 inch to about 0.1 inch, such as, from about 0.01 inch to about 0.05 inch, for example, about 0.02 inch.

The length of the cathodic strips 662 may be the same, substantially the same, or shorter than the height of the cathodic half cell 622. Each cathodic strip 662 and/or slots 664 may have a length within a range from about 5 cm (about 1.97 inches) to about 300 cm (about 118.11 inches). In some examples, each cathodic strip 662 and/or slots 664 may have a length within a range from about 20 cm (about 7.87 inches) to about 200 cm (about 78.74 inches), or from about 50 cm (about 19.69 inches) to about 100 cm (about 39.37 inches). In other examples, each cathodic strip 662 and/or slots 664 may have a length within a range from about 5 cm (about 1.97 inches) to about 50 cm (about 19.69 inches), such as from about 20 cm (about 7.87 inches) to about 30 cm (about 11.81 inches). Each cathodic strip 662 and/or slot 664 may have a width within a range from about 0.005 inch to about 0.1 inch, such as, from about 0.01 inch to about 0.05 inch, for example, about 0.02 inch. Each cathodic strip 662 and/or slot 664 may have a thickness within a range from about 0.005 inch to about 0.1 inch, such as, from about 0.01 inch to about 0.05 inch, for example, about 0.02 inch.

FIG. 6C depicts cathodic strips 662 aligned in straight and parallel rows as viewed across the front surface of slotted sheet cathode 660. However, in alternative embodiments, the plurality of cathodic strips 662 may be unaligned, not parallel, and/or asymmetrical as viewed across the front surface of slotted sheet cathode 660. The cathodic strips 662 and/or each of the slots 664 may independently have various geometries or shapes. In some examples, cathodic strips 662 are formed during one or more processes which may include cutting, stamping, punching, or forging the cathodic strips 662 in order to have a particular two or three dimensional geometry. Each of the cathodic strips 662 and/or each of the slots 664 may independently have a geometry or shape selected from rectangle, square, circle, oval, eclipse, curve, round, derivatives thereof, as well as other geometries.

In some embodiments, the slotted sheet cathode 660 may be further processed to obtain a particular shape or geometry and/or to provide a particular finished surface. For example, the slotted sheet cathode 660 may be processed to round or smooth the edges of the cathodic strips 662. In some examples, surfaces of the slotted sheet cathode 660—including the edges of the cathodic strips 662 which extend along the length each cathodic strip 662—may be ground, filed, bent, rounded, sand-blasted, chemically-etched, heat-treated, plasma-treated, polished, or processed by other techniques in order to prepare smooth or rounded edges or other desirable surfaces on the slotted sheet cathode 660.

In one example, slotted sheet cathode 660 is formed from a metallic sheet in which slots 664 of a rectangular geometry have been stamped or otherwise formed through the metallic sheet. The metallic sheet may have a thickness of about 0.02 inch—therefore—the cathodic strips 662 have the same corresponding thickness of about 0.02 inch. The slots 664 may be stamped out having a width of about 0.02 inch and are spaced apart by about 0.02 inch—therefore—the cathodic strips 662 have the same corresponding width of about 0.02 inch. Also, the slots 664 may be stamped out having a length of about 10 inches—therefore—the cathodic strips 662 have the same corresponding length of about 10 inches.

FIG. 6A depicts contact bar 629 coupled to and in electrical contact with each of the slotted sheet cathodes 660. One contact bar 629 is depicted in FIG. 6A, however, numerous contact bars may be used to individually control each cathodic strip 662 or an array of cathodic strips 662. In many embodiments, contact bar 629 may be in electrical contact with cathodic contact 628 by a controller and/or a set of switches (not shown). The controller and/or the set of switches may be coupled between and in electrical communication to the cathodic contact 628 and the contact bar 629 or multiple contact bars. The controller and/or the set of switches may be used to independently control by electrically connecting/disconnecting each of the slotted sheet cathodes 660—and therefore each row of the cathodic strips 662 contained within each slotted sheet cathode 660—to the cathodic contact 628. In some configurations, the controller and/or the set of switches may be used to independently charge and/or discharge each slotted sheet cathode 660. Once in electrical contact with cathodic contact 628, the cathodic strips 662 become energized cathodes which are capable of being plated/deplated during charge/discharge cycles.

In one embodiment, the controller is utilized to sequentially charge and/or discharge each of the slotted sheet cathodes 660. In some examples, cathodic half cell 622 may contain two arrays of slotted sheet cathodes 660, such that the first array contains energized slotted sheet cathodes and the second array contains non-energized slotted sheet cathodes. The first and second arrays may each have 1, 2, 3, 4, or more slotted sheet cathodes 660. In one specific example, cathodic half cell 622 contains a first array of two energized slotted sheet cathodes 660 and a second array of two non-energized slotted sheet cathodes 660.

Contact bar 629 may be disposed inside or outside the cathodic half cell 622, or within any of the surrounding walls or surfaces of cathodic half cell 622, such as the bottom portion 612, the top portion 614, and/or the sides 616 of cathodic half cell 622. Contact bar 629 may also extend along at any length, width, and/or height of the cathodic half cell 622. In some embodiments, contact bar 629 may be disposed within the top portion 614 of cathodic half cell 622, as depicted in FIG. 6B. In other embodiments, contact bar 629 may be disposed outside of the surrounding walls or surfaces of cathodic half cell 622. For example, contact bar 629 or a contact junction thereof may protrude through the bottom portion 612, the top portion 614, and/or the sides 616 of cathodic half cell 622 to be physically and electrically coupled with each of the cathodic strips 662. Alternatively, each of the cathodic strips 662 may protrude through the bottom portion 612, the top portion 614, and/or the sides 616 of cathodic half cell 622 to be physically and electrically coupled with contact bar 629. Contact bar 629 contains a conductive material, such as a metal. Contact bar 629 may be a wire, a plate, a bar, a ribbon, or similar contact/conductive surface. Contact bar 629 may contain iron, steel, stainless steel, copper, nickel, chromium, silver, gold, aluminum, cadmium, platinum, palladium, platings or coatings thereof, alloys thereof, derivatives thereof, or combinations thereof.

FIG. 6A depicts cathodic half cell 622 containing two slotted sheet cathodes 660 which are spaced apart with only catholyte 626 flowing between each slotted sheet cathodes 660. In an alternative embodiment, not shown, cathodic half cell 622 contains a plurality of slotted sheet cathodes 660 which are separated by thin electrically insulating sheets disposed between the slotted sheet cathodes 660. The electrically thin insulating sheets prevent neighboring slotted sheet cathodes 660 from electrically contacting each other when conducting sequential charge/discharge cycles.

Anodic half cell 642 is on the anodic side 640 of flow battery system 600 and contains anode 644, which may be in fluid and/or conductive communication with anolyte 646. Anolyte 646 may be a liquid electrolyte, such as an aqueous based electrolyte or a solid electrolyte. In embodiments when anolyte 646 is a liquid anolyte, anolyte 646 flows into anolyte inlet 652 disposed on anodic half cell 642, along anolyte pathway 653, and out from anolyte outlet 644 disposed on anodic half cell 642. Anolyte pathway 653 extends between anolyte inlet 652 and anolyte outlet 654, as well as between anode 644 and electrolyte membrane 610 within anodic half cell 642.

Outside of flow battery cell 602, in embodiments when anolyte 646 is a liquid anolyte, anolyte 646 circulates between anodic half cell 642 and anolyte source tank 650 by conduits 656. Conduits 656 extend between anolyte source tank 650 to anolyte inlet 652 and from anolyte outlet 654 to anolyte source tank 650. One or multiple pumps, such as pump 658, may be incorporated within flow battery system 600 to help flow anolyte 646 to and from anodic half cell 642. In some examples, pump 658 may be disposed between anolyte source tank 650 and anolyte inlet 642 and connected therebetween by conduits 656. In other examples, pump 658 may be disposed between anolyte source tank 650 and anolyte outlet 634 and connected therebetween by conduits 656. Therefore, in one specific example, anolyte 646 may circulate within the anodic side 640 of flow battery system 600 by flowing from anolyte source tank 650, through conduits 656, through anolyte inlet 652, along anolyte pathway 653 within anodic half cell 642, through anolyte outlet 654, through conduits 656, and back to anolyte source tank 650. Anolyte 646 may have a forward flow (as depicted in FIG. 6A with arrows) or may have a reverse flow during different time periods of the charge/discharge cycles. The fluid velocity of anolyte 646 may be within a range from about 1 cm/sec to about 25 cm/sec, such as from about 2 cm/sec to about 15 cm/sec, for example, about 5 cm/sec or about 10 cm/sec.

In some embodiments, anolyte 646 may be a solid anolyte, and therefore, certain portions or elements of the anodic side 640, as depicted in FIG. 6A, may be optional or absent portions or derivatives thereof, such as anolyte inlet 652, anolyte outlet 654, anolyte source tank 650, conduits 656, and/or pump 658. A solid anolyte 246 may have a thickness within a range from about 0.2 mm to about 5 mm, or from about 0.5 mm to about 3 mm, such as about 1 mm or about 2 mm.

In some examples, anolyte 646 may be an Fe(II)/Fe(III) electrolyte, such as a ferro/ferricyanide electrolyte. Anolyte 646 may initially contain a ferrocyanide compound which is oxidized to the respective ferricyanide compound during a recharge of the battery or cell. Several exemplary ferrocyanide compounds that may be contained within the anolyte 646 include sodium ferrocyanide, such as tetrasodium hexacyanoferrate decahydrate ($Na_4Fe(CN)_6 \cdot 10H_2O$), also known as yellow prussiate of soda, available from ScienceLab.com, as well as potassium ferrocyanide, such as tetrapotassium hexacyanoferrate decahydrate ($K_4Fe(CN)_6 \cdot 10H_2O$). Anolyte 646 generally contains hydroxide and additional hydroxide solution may be added to the anolyte 646 during the charge/discharge cycles in order to maintain a desired hydroxide concentration. The aqueous hydroxide solution generally contains sodium hydroxide, potassium hydroxide, or mixtures thereof.

Anode 644, such as a redox electrode, may have a variety of geometries, such as a flat planar anode, a planar anode, a plate anode, a cylindrical anode, or the like. Anode 644 may be may be solid, or may have a high surface area configuration, such as being porous, expanded or foamed. Usually, anode 644 contains nickel, iron, chromium, steel, stainless steel, graphite, alloys thereof, derivatives thereof, or combinations thereof. Anode 644 may be plated or coated with another material or metal, such as a graphite anode coated or plated with nickel or a nickel alloy. In one example, anode 644 is a planar electrode and contains stainless steel. In another example, anode 644 is porous, foamed, or expanded and contains nickel or a nickel alloy, such as nickel foam, expanded nickel, perforated nickel, nickel wire, or woven nickel wire. In another example, anode 644 contains graphite, such as porous graphite, graphite foam, nickel plated graphite foam, graphite felt, nickel plated graphite felt, or derivatives thereof. In some embodiments, anode 644 may have a length within a range from about 5 cm to about 300 cm, such as from about 10 cm to about 50 cm, such as from about 20 cm to about 30 cm and may have a height within a range from about 5 cm to about 300 cm, such as from about 10 cm to about 50 cm, such as from about 20 cm to about 30 cm. Additionally, anode 644 may have a thickness within a range from about 0.5 mm to about 5 mm, such as from about 1 mm to about 3 mm.

Electrolyte membrane 610 is disposed between cathodic half cell 622 and anodic half cell 642 and in contact with both catholyte 626 and anolyte 646. Electrolyte membrane 610 may be an exchange membrane, a separator, or the like which isolates catholyte 626 and anolyte 646. In many embodiments, electrolyte membrane 610 is an ionic exchange membrane—such as a cationic exchange membrane—which is semipermeable to some cations (e.g., Na+ or K+) which migrate through electrolyte membrane 610 between the anolyte 646 and catholyte 626. Electrolyte membrane 610 may contain or be made from an ionic resin and/or a polymeric, co-polymeric, or oligomeric material, such as polytetrafluoroethylene, polyvinyl, polystyrene, polyethylene, polypropylene, polyester, derivatives thereof, or combinations thereof. Generally, electrolyte membrane 610 is durable and has high ionic conductivity and chemical stability. In one example, electrolyte membrane 610 contains a polymeric backbone of PTFE, such as NAFION® 112, 115, 117, and 424 membranes, which are commercially available from DuPont. In another example, electrolyte membrane 610 contains a co-polymer of tetrafluoroethylene and a vinylene monomer, such as a XUS® membrane, which is commercially available from Dow Chemical Company. Electrolyte membrane 610 may have a thickness within a range from about 0.005 mm to about 0.5 mm. In some examples, electrolyte membrane 610 may have a thickness of about 0.015 mm. In an alternative embodiment, electrolyte membrane 110 may be a separator, such as a ribbed separator, formed from a polymeric material and precipitated silica, such that the internal structure is very porous, tortuous, and hydrophilic (e.g., hydrophilic porous plastic separator), which is commercially available from the AMER-SIL company.

Although flow battery system 600 is illustrated having just one flow battery cell 602, however, flow battery system 600 often contains multiple cells similar to flow battery cell 602. The specific quantity of flow battery cells 602 may be determined based on the total capacity of each flow battery cell 602 and the relative total desired energy capacity for the overall flow battery system 600. A plurality of flow battery cells 602 may be connected together for storing the total desired energy capacity.

Cathodic contact 628 and anodic contact 648 may be coupled to or otherwise in electrical contact with for discharging or removing the stored power from flow battery cell 602 while in use, or alternatively, for charging or storing power to flow battery system 600. Each flow battery cell 602 may be electrically connected (e.g., in parallel or in series) by cathodic contacts 628 and anodic contacts 648 to form the desirable circuit for flow battery system 600. In one example, the plurality of flow battery cells 602 may be electrically connected in series in order to have constant amperage and increased voltage for flow battery system 600. Alternatively, the plurality of flow battery cells 602 may be electrically connected in parallel in order to have constant voltage and increased amperage for flow battery system 600.

While the foregoing is directed to embodiments of the invention, other and further embodiments of the invention may be devised without departing from the basic scope thereof, and the scope thereof is determined by the claims that follow.

The invention claimed is:

1. A flow battery cell, comprising:
a cathodic half cell comprising a catholyte, a catholyte inlet, a catholyte outlet, a catholyte pathway extending between the catholyte inlet and outlet and within the cathodic half cell, and a cathode comprising a plurality of cathodic wires extending perpendicular or substantially perpendicular to and within the catholyte pathway and in contact with the catholyte, wherein each of the cathodic wires extends parallel or substantially parallel to each other;
an anodic half cell comprising an anode in conductive contact with an anolyte;
an electrolyte membrane disposed between the cathodic half cell and the anodic half cell and in contact with the catholyte and anolyte; and
a cathodic contact electrically connected with the cathode and disposed outside of the cathodic half cell.

2. The flow battery cell of claim 1, wherein the cathodic wires comprise cadmium or a cadmium alloy.

3. The flow battery cell of claim 2, wherein the cathodic wires comprises wires selected from the group consisting of solid cadmium wires, stainless steel wires plated or coated with cadmium or a cadmium alloy, metallic wires plated or coated with cadmium or a cadmium alloy, derivatives thereof, and combinations thereof.

4. The flow battery cell of claim 2, wherein the cathodic wires have a diameter within a range from about 0.01 inch to about 0.04 inch and a length within a range from about 5 cm to about 300 cm.

5. The flow battery cell of claim 1, further comprising an anodic contact electrically connected with the anode and disposed outside of the anodic half cell, and the anode comprises iron, nickel, chromium, steel, stainless steel, alloys thereof, or combinations thereof.

6. The flow battery cell of claim 1, wherein the electrolyte membrane comprises a polymeric material and has a thickness within a range from about 0.005 mm to about 0.5 mm.

7. The flow battery cell of claim 1, wherein the plurality of cathodic wires comprises at least one row of cathodic wires, the at least one row extends along the catholyte pathway, the cathodic wires are spaced a predetermined distance from each other within the row, and the predetermined distance is equal to or substantially equal to the circumference of the individual cathodic wire.

8. The flow battery cell of claim 1, wherein the plurality of cathodic wires comprises at least two arrays of cathodic wires, each array comprises at least one row of cathodic wires, and the rows extend along the catholyte pathway.

9. The flow battery cell of claim 8, wherein the plurality of cathodic wires comprises at least four rows of cathodic wires.

10. The flow battery cell of claim 9, wherein a first array of cathodic wires comprises energized cathodic wires and a second array of cathodic wires comprises non-energized cathodic wires.

11. The flow battery cell of claim 10, wherein the first array of cathodic wires comprises at least two rows of energized cathodic wires and the second array of cathodic wires comprises at least two rows of non-energized cathodic wires.

12. The flow battery cell of claim 11, wherein the first array of cathodic wires is disposed between the second array of cathodic wires and the electrolyte membrane or wherein the second array of cathodic wires is disposed between the first array of cathodic wires and the electrolyte membrane.

13. A flow battery system comprising two or more flow battery cells of claim 1.

* * * * *

UNITED STATES PATENT AND TRADEMARK OFFICE
CERTIFICATE OF CORRECTION

| | | |
|---|---|---|
| PATENT NO. | : 8,808,888 B2 | Page 1 of 1 |
| APPLICATION NO. | : 12/868489 | |
| DATED | : August 19, 2014 | |
| INVENTOR(S) | : Wilson et al. | |

It is certified that error appears in the above-identified patent and that said Letters Patent is hereby corrected as shown below:

In the Specification

Column 16, Line 16, please insert --battery cell 202 operates at a high overall current density by simultaneously energizing-- after flow.

Signed and Sealed this
Sixth Day of January, 2015

Michelle K. Lee
*Deputy Director of the United States Patent and Trademark Office*